US011401841B2

(12) United States Patent
Mitsutani

(10) Patent No.: US 11,401,841 B2
(45) Date of Patent: Aug. 2, 2022

(54) VALVE DEVICE

(71) Applicant: DENSO CORPORATION, Kariya (JP)

(72) Inventor: Tetsuro Mitsutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 17/016,467

(22) Filed: Sep. 10, 2020

(65) Prior Publication Data

US 2020/0408115 A1    Dec. 31, 2020

Related U.S. Application Data

(63) Continuation of application No. PCT/JP2019/011257, filed on Mar. 18, 2019.

(30) Foreign Application Priority Data

Mar. 22, 2018 (JP) .............................. JP2018-054683

(51) Int. Cl.
| | |
|---|---|
| *F16K 15/00* | (2006.01) |
| *F01L 1/344* | (2006.01) |
| *F01L 1/047* | (2006.01) |
| *F16K 15/08* | (2006.01) |
| *F16K 15/14* | (2006.01) |

(52) U.S. Cl.
CPC ............ *F01L 1/3442* (2013.01); *F01L 1/047* (2013.01); *F01L 2001/3443* (2013.01); *F01L 2001/3444* (2013.01); *F16K 15/08* (2013.01); *F16K 15/142* (2013.01)

(58) Field of Classification Search
CPC ....... F01L 1/3442; F16K 15/08; F16K 15/142
See application file for complete search history.

(56) References Cited

U.S. PATENT DOCUMENTS

| | | | | |
|---|---|---|---|---|
| 4,690,171 | A | * | 9/1987 | Johnston .............. A61B 5/0235 |
| | | | | 137/625.48 |
| 2003/0070713 | A1 | | 4/2003 | Cornea et al. |
| 2006/0225791 | A1 | | 10/2006 | Patze et al. |
| 2012/0042843 | A1 | | 2/2012 | Kubota et al. |

FOREIGN PATENT DOCUMENTS

JP      2012-197936      10/2012

* cited by examiner

*Primary Examiner* — P. Macade Nichols
(74) *Attorney, Agent, or Firm* — Nixon & Vanderhye P.C.

(57) ABSTRACT

An annular groove has: a side peripheral surface that is shaped in a ring form and is formed such that the side peripheral surface inwardly extends from a bottom surface of the annular groove in a radial direction of a tubular member and is joined to an inner peripheral wall of the tubular member; and a specific shape surface that is formed along at least a part of the side peripheral surface between a bottom surface side end part and an inner peripheral wall side end part of the side peripheral surface such that a diameter of the specific shape surface is progressively reduced in an axial direction of the tubular member from one axial side, at which the bottom surface is placed, toward another axial side, at which the inner peripheral wall is placed.

12 Claims, 16 Drawing Sheets

VALVE DEVICE

CROSS REFERENCE TO RELATED APPLICATIONS

This application is a continuation application of International Patent Application No. PCT/JP2019/011257 filed on Mar. 18, 2019, which designated the U.S. and claims the benefit of priority from Japanese Patent Application No. 2018-054683 filed on Mar. 22, 2018. The entire disclosures of all of the above applications are incorporated herein by reference.

TECHNICAL FIELD

The present disclosure relates to a valve device.

BACKGROUND

Previously, there is proposed a valve device that is configured to control a flow of fluid. For example, one such a valve device includes a tubular member and a check valve. The tubular member has: an annular groove that is radially outwardly recessed from an inner peripheral wall of the tubular member and circumferentially extends in an annular form; and a plurality of inflow holes, each of which communicates between a cylindrical bottom surface of the annular groove and an outer wall of the tubular member. The check valve has a valve main body that is made of a single plate material longitudinally elongated and circumferentially wound along a length of the single plate material to have a tubular form, and the check valve is installed in the annular groove such that a circumferential direction of the valve main body coincides with a circumferential direction of the bottom surface of the annular groove. The annular groove has two side peripheral surfaces, which are axially opposed to each other. Each of the side peripheral surfaces is shaped in a ring form and is formed such that the side peripheral surface inwardly extends from the bottom surface of the annular groove in the radial direction of the tubular member and is joined to the inner peripheral wall of the tubular member. Here, the side peripheral surface is formed to be perpendicular to an axis of the tubular member.

SUMMARY

This section provides a general summary of the disclosure, and is not a comprehensive disclosure of its full scope or all of its features.

According to the present disclosure, there is provided a valve device including a tubular member and a check valve. The tubular member has an annular groove and an inflow hole. The annular groove is radially outwardly recessed from an inner peripheral wall of the tubular member and circumferentially extends in an annular form. The inflow hole communicates between a bottom surface of the annular groove and an outer wall of the tubular member while the bottom surface is shaped in a form of a cylindrical surface. The check valve has a valve main body that is made of a single plate material longitudinally elongated and circumferentially wound along a length of the single plate material to have a tubular form. The check valve is installed in the annular groove such that a circumferential direction of the valve main body coincides with a circumferential direction of the bottom surface of the annular groove, and the check valve is configured to enable an inflow of fluid into an inside of the tubular member through the inflow hole and limit an outflow of the fluid from the inside of the tubular member into the inflow hole. The annular groove has a specific shape surface. A diameter of the specific shape surface is progressively reduced in an axial direction of the tubular member from one axial side, at which the bottom surface is placed, toward another axial side, at which the inner peripheral wall is placed.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
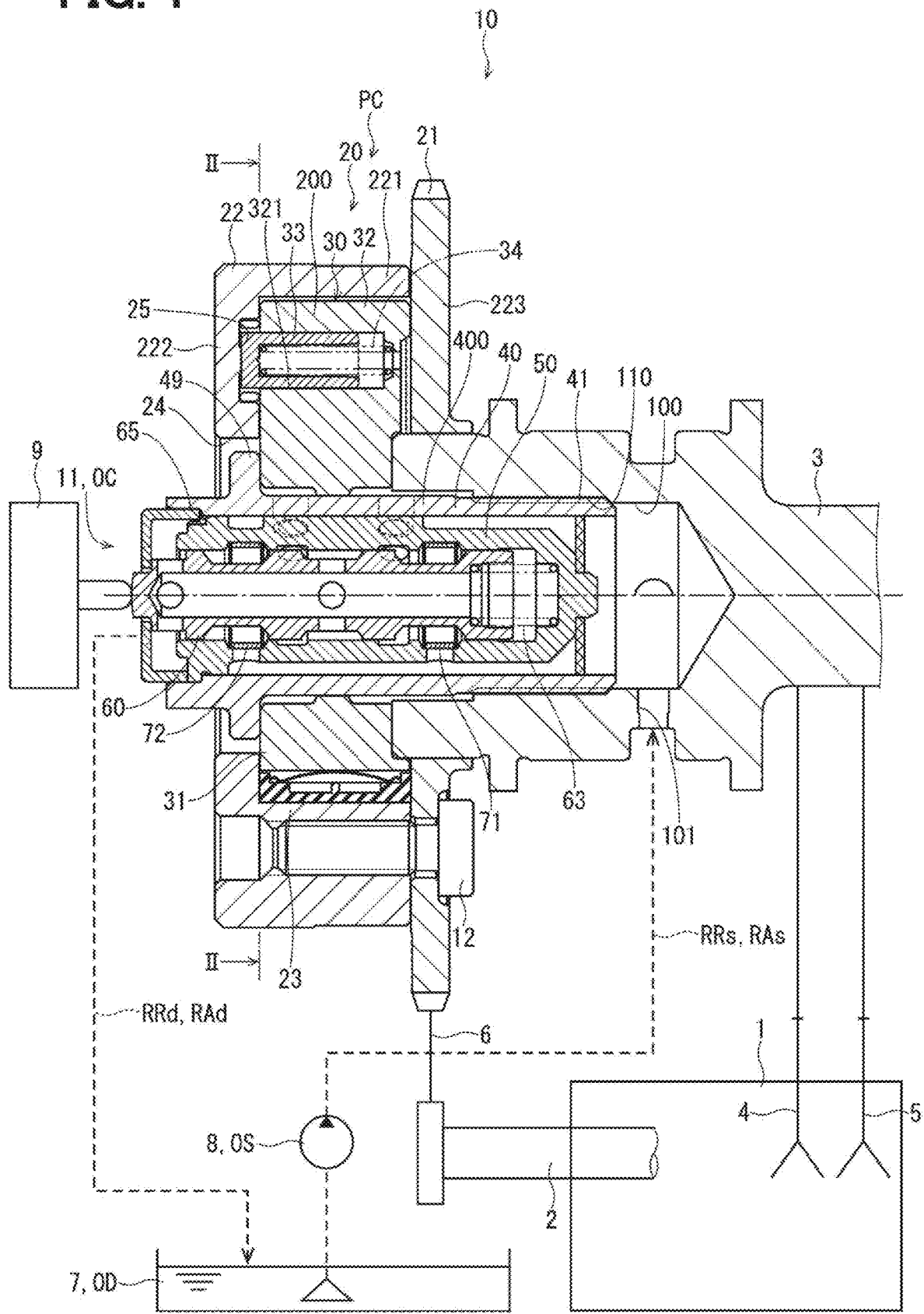
FIG. 1 is a cross-sectional view showing a valve timing adjustment device, in which a valve device of a first embodiment is applied.

Previously, there is proposed a valve device that is configured to control a flow of fluid. One such a valve device includes a tubular member and a check valve. The tubular member has: an annular groove that is radially outwardly recessed from an inner peripheral wall of the tubular member and circumferentially extends in an annular form; and a plurality of inflow holes, each of which communicates between a cylindrical bottom surface of the annular groove and an outer wall of the tubular member.

The check valve has a valve main body that is made of a single plate material longitudinally elongated and circumferentially wound along a length of the single plate material to have a tubular form, and the check valve is installed in the annular groove such that a circumferential direction of the valve main body coincides with a circumferential direction of the bottom surface of the annular groove. The check valve is configured to enable an inflow of fluid into an inside of the tubular member through the inflow holes and limit an outflow of the fluid from the inside of the tubular member into the inflow holes. The check valve is placed in a valve opening state when a diameter of the check valve is reduced by a flow of the fluid that flows toward the inside of the tubular member through the inflow holes. Furthermore, the annular groove has two side peripheral surfaces, which are axially opposed to each other. Each of the side peripheral surfaces is shaped in a ring form and is formed such that the side peripheral surface inwardly extends from the bottom surface of the annular groove in the radial direction of the tubular member and is joined to the inner peripheral wall of the tubular member. Here, the side peripheral surface is formed to be perpendicular to an axis of the tubular member.

At the valve opening time of the check valve, the diameter of the check valve may possibly be reduced to such an extent that a portion of an outer peripheral wall of the valve main body is placed on an inner side of the inner peripheral wall of the tubular member. In this state, in a case where the check valve is tilted at the inside of the annular groove, when the diameter of the valve main body is increased in response to valve closing of the check valve, the outer peripheral wall of the valve main body collides against a corner between the inner peripheral wall of the tubular member and the annular groove to possibly damage the valve main body or the inner peripheral wall of the tubular member.

In a case where a spring constant of the valve main body is increased by increasing a plate thickness of the valve main body to limit the occurrence of the reduction of the diameter of the tubular member at the valve opening time of the check valve to such an extent that the portion of the outer peripheral wall of the valve main body is placed on the inner side of the inner peripheral wall of the tubular member, a pressure loss of the fluid, which flows toward the inner side of the tubular member through the inflow holes, is increased, to possibly cause a reduction in a flow rate of the fluid.

A valve device of the present disclosure includes a tubular member and a check valve. The tubular member has: an annular groove that is radially outwardly recessed from an inner peripheral wall of the tubular member and circumferentially extends in an annular form; and an inflow hole that communicates between a bottom surface of the annular groove and an outer wall of the tubular member while the bottom surface is shaped in a form of a cylindrical surface. The check valve has a valve main body that is made of a single plate material longitudinally elongated and circumferentially wound along a length of the single plate material to have a tubular form. The check valve is installed in the annular groove such that a circumferential direction of the valve main body coincides with a circumferential direction of the bottom surface of the annular groove. The check valve is configured to enable an inflow of fluid into an inside of the tubular member through the inflow hole and limit an outflow of the fluid from the inside of the tubular member into the inflow hole.

The annular groove has: a side peripheral surface that is shaped in a ring form and is formed such that the side peripheral surface inwardly extends from the bottom surface in a radial direction of the tubular member and is joined to the inner peripheral wall; and a specific shape surface that is formed along at least a part of the side peripheral surface between a bottom surface side end part and an inner peripheral wall side end part of the side peripheral surface such that a diameter of the specific shape surface is progressively reduced in an axial direction of the tubular member from one axial side, at which the bottom surface is placed, toward another axial side, at which the inner peripheral wall is placed while the bottom surface side end part is one end part of the side peripheral surface located at one radial side where the bottom surface is placed, and the inner peripheral wall side end part is another end part of the side peripheral surface located at another radial side where the inner peripheral wall is placed.

At the valve opening time of the check valve, a diameter of the valve main body may possibly be reduced to such an extent that a portion of the outer peripheral wall of the valve main body is placed on an inner side of the inner peripheral wall of the tubular member. In this state, in a case where the check valve is tilted at the inside of the annular groove, when the diameter of the valve main body is increased in response to valve closing of the check valve, an axial end part of the outer peripheral wall of the valve main body contacts the specific shape surface. When the diameter of the valve main body is further increased, the axial end part of the outer peripheral wall of the valve main body is slid along the specific shape surface and is moved toward the bottom surface. As discussed above, in the present disclosure, since the annular groove has the specific shape surface, the movement of the outer peripheral wall of the valve main body toward the bottom surface is guided by the specific shape surface without resulting in collision of the outer peripheral wall of the valve main body against the inner peripheral wall of the tubular member at the valve closing time of the valve main body. Therefore, it is possible to limit the collision of the outer peripheral wall of the valve main body against the corner formed between the inner peripheral wall of the tubular member and the annular groove. Thus, it is possible to limit the damage of the valve main body or the inner peripheral wall of the tubular member.

Hereinafter, a valve device and a valve timing adjustment device according to a plurality of embodiments of the present disclosure will be described with reference to the drawings. Components, which are substantially identical to each other, are indicated by the same reference signs and will not be described redundantly. Furthermore, the components, which are substantially identical to each other in the plurality of embodiments, exert the same or similar effects and advantages.

First Embodiment

Figure 2:
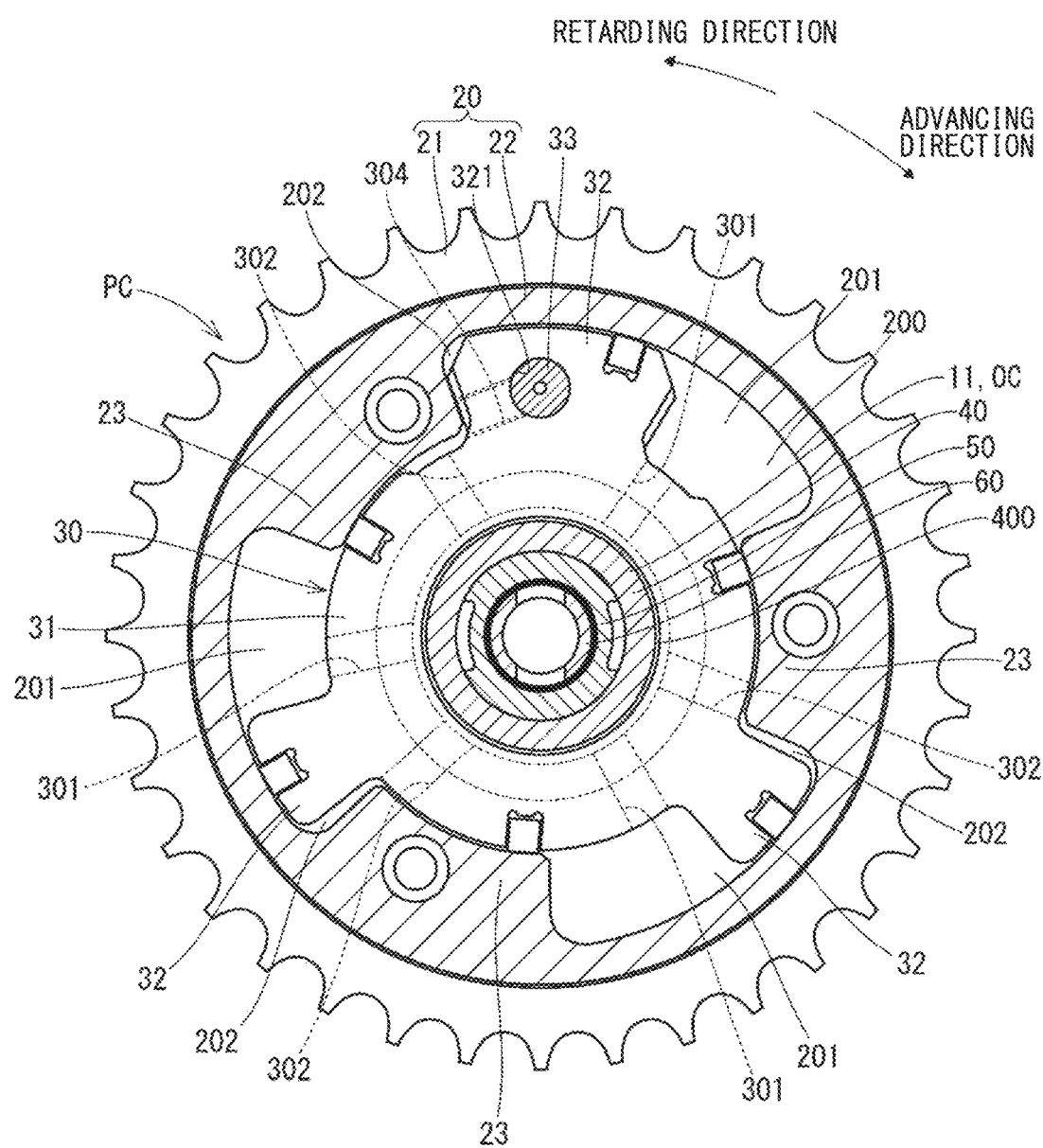
FIG. 2 is a cross-sectional view taken along line II-II in FIG. 1.

FIGS. 1 and 2 show a valve device and a valve timing adjustment device having the valve device according to a first embodiment. The valve timing adjustment device 10 changes a rotational phase of a camshaft 3 relative to a crankshaft 2 of an engine 1 (serving as an internal combustion engine), so that the valve timing adjustment device 10 adjusts a valve timing of intake valves 4 driven to open and close by the camshaft 3 among the intake valves 4 and exhaust valves 5. The valve timing adjustment device 10 is installed in a drive force transmission path that extends from the crankshaft 2 to the camshaft 3. The crankshaft 2 corresponds to a drive shaft. The camshaft 3 corresponds to a driven shaft. The intake valves 4 and the exhaust valves 5 correspond to valves.

The structure of the valve timing adjustment device 10 will be described with reference to FIGS. 1 and 2. The valve timing adjustment device 10 includes a phase converter PC, a hydraulic oil source OS, a hydraulic oil controller (serving as a valve device) OC, a discharge portion OD, a retard supply passage RRs, an advance supply passage RAs, a retard drain passage RRd and an advance drain passage RAd while the retard drain passage RRd and the advance drain passage RAd serve as drain passages.

The phase converter PC has a housing 20 and a vane rotor 30. The housing 20 has a gear portion 21 and a case 22. The case 22 has a tubular portion 221 and plate portions 222, 223. The tubular portion 221 is shaped in a tubular form. The plate portion 222 is integrally formed with the tubular portion 221 in one piece such that the plate portion 222 closes one end of the tubular portion 221. The plate portion 223 is formed to close the other end of the tubular portion 221. In this way, a space 200 is formed in an inside of the housing 20. The plate portion 223 is fixed to the tubular portion 221 by bolts 12. The gear portion 21 is formed at an outer periphery of the plate portion 223.

The plate portion 223 is fitted to an end portion of the camshaft 3. The camshaft 3 rotatably supports the housing 20. A chain 6 is wound around the gear portion 21 and the crankshaft 2. The gear portion 21 is rotated synchronously with the crankshaft 2. The case 22 forms a plurality of partition wall portions 23 that inwardly project from the tubular portion 221 in the radial direction. An opening 24 is formed at a center of the plate portion 222 of the case 22 such that the opening 24 opens to the space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. The space 200, which is formed in the inside of the housing 20, is partitioned into a retard chamber 201 and an advance chamber 202 by each vane 32. That is, the housing 20 forms the retard chambers 201 and the advance chambers 202 between the housing 20 and the vane rotor 30. The retard chamber 201 is positioned on one circumferential side of the vane 32. The advance chamber 202 is positioned on the other circumferential side of the vane 32. The vane rotor 30 rotates relative to the housing 20 in a retarding direction or an advancing direction according to an oil pressure in the respective retard chambers 201 and an oil pressure in the respective advance chambers 202.

In the present embodiment, the hydraulic oil controller OC is a valve device 11. The valve device 11 includes a sleeve 400, a spool 60, a retard supply check valve 71 and an advance supply check valve 72 while the retard supply check valve 71 and the advance supply check valve 72 serve as check valves. The valve device 11 controls a flow of the hydraulic oil (serving as fluid) and controls supply of the hydraulic oil to the retard chambers 201 and the advance chambers 202 and discharge of the hydraulic oil from the retard chambers 201 and the advance chambers 202.

In the present embodiment, the valve device 11 is placed at the center part of the housing 20 and the vane rotor 30 (see FIGS. 1 and 2). Specifically, the valve device 11 is placed such that at least a portion of the valve device 11 is located in the inside of the housing 20. The sleeve 400 has an outer sleeve 40 and an inner sleeve (serving as a tubular member) 50.

Figure 3:
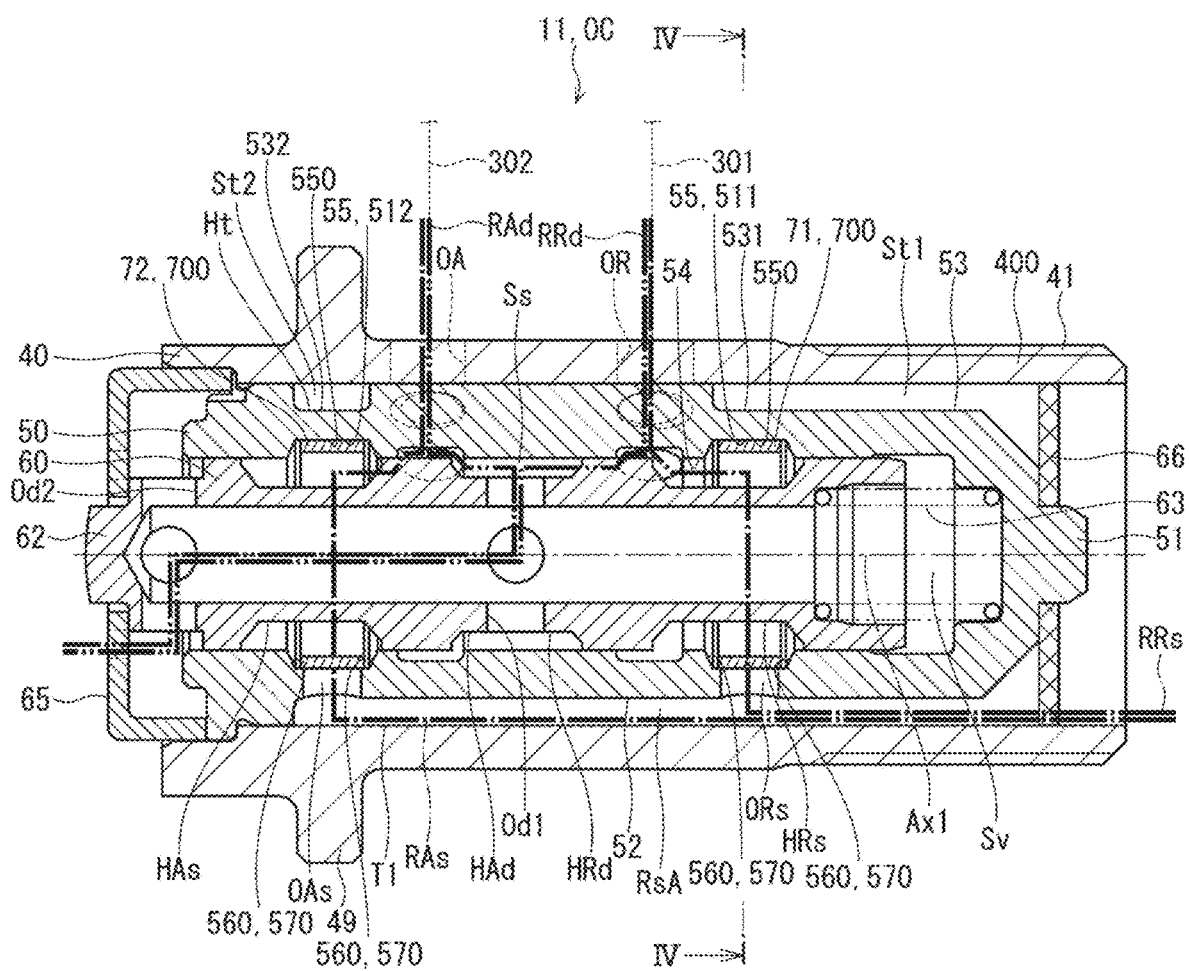
FIG. 3 is a cross-sectional view showing the valve device of the first embodiment.

The outer sleeve 40 is shaped in a substantially cylindrical tubular form and is made of a material, which includes, for example, iron and has relatively high hardness. An inner peripheral wall of the outer sleeve 40 is shaped generally in a cylindrical form. As shown in FIG. 3, a threaded portion 41 is formed at an outer peripheral wall of one end part of the outer sleeve 40. A retaining portion 49 is formed at the other end part of the outer sleeve 40 such that the retaining portion 49 is shaped in a ring form and outwardly extends from an outer peripheral wall of the other end part of the outer sleeve 40 in the radial direction.

A shaft hole 100 and a supply hole 101 are formed at the end portion of the camshaft 3 located on the valve timing adjustment device 10 side. The shaft hole 100 is formed to extend in an axial direction of the camshaft 3 from a center part of an end surface of the camshaft 3, which is located on the valve timing adjustment device 10 side. The supply hole 101 is formed such that the supply hole 101 inwardly extends from an outer wall of the camshaft 3 in the radial direction and is communicated with the shaft hole 100.

A shaft-side threaded portion 110 is formed at an inner wall of the shaft hole 100 of the camshaft 3 to threadably engage with the threaded portion 41 of the outer sleeve 40. The outer sleeve 40 passes through the inside of the boss 31 of the vane rotor 30 and is fixed to the camshaft 3 such that the threaded portion 41 of the outer sleeve 40 is engaged with the shaft-side threaded portion 110 of the camshaft 3. At this time, the retaining portion 49 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 49. The outer sleeve 40 is thus installed to the center of the vane rotor 30.

In the present embodiment, the hydraulic oil source OS is an oil pump 8. The oil discharge portion OD is an oil pan 7. The oil pump 8 is connected to the supply hole 101. The oil pump 8 suctions the hydraulic oil stored in the oil pan 7 and supplies the suctioned hydraulic oil to the supply hole 101. As a result, the hydraulic oil flows into the shaft hole 100.

The inner sleeve (serving as a tubular member) 50 is shaped generally in a cylindrical tubular form and is made of a material, which includes, for example, aluminum and has relatively low hardness. Specifically, the inner sleeve 50 is made of the material that has the hardness lower than that of the outer sleeve 40. An outer peripheral wall of the inner sleeve 50 is shaped generally in a cylindrical form.

As illustrated in FIG. 3, the inner sleeve 50 is placed at the inside of the outer sleeve 40 such that the outer peripheral wall of the inner sleeve 50 is fitted to the inner peripheral wall of the outer sleeve 40. The inner sleeve 50 is immovable relative to the outer sleeve 40.

A sleeve sealing portion 51 is formed at one end of the inner sleeve 50. The sleeve sealing portion 51 closes the one end of the inner sleeve 50.

The spool 60 is shaped generally in a cylindrical tubular form and is made of, for example, metal. The spool 60 is placed in an inside of the inner sleeve 50 such that an outer peripheral wall of the spool 60 is slidable along the inner peripheral wall 54 of the inner sleeve 50 to enable reciprocation of the spool 60 in the axial direction.

A spool sealing portion 62 is formed at one end of the spool 60. The spool sealing portion 62 closes the one end of the spool 60. A variable volume space Sv is formed between the sleeve sealing portion 51 and the other end of the spool 60 at the inside of the inner sleeve 50. A volume of the variable volume space Sv changes when the spool 60 is moved relative to the inner sleeve 50 in the axial direction. Specifically, the sleeve sealing portion 51 forms the variable volume space Sv, the volume of which changes, between the sleeve sealing portion 51 and the spool 60.

A spring 63 is installed in the variable volume space Sv. The spring 63 is a so-called coil spring. One end of the spring 63 contacts the sleeve sealing portion 51, and other end of the spring 63 contacts the other end part of the spool 60. The spring 63 urges the spool 60 in a direction away from the sleeve sealing portion 51.

A retaining portion 65 is placed on the radially inner side of the other end part of the outer sleeve 40. The retaining portion 65 is shaped in a bottomed tubular form. An outer peripheral wall of the retaining portion 65 is fitted to the inner peripheral wall of the outer sleeve 40. A hole is formed at a center of a bottom of the retaining portion 65, and the spool sealing portion 62 is installed in an inside of this hole.

The bottom of the retaining portion 65 is configured to retain the one end of the spool 60. The retaining portion 65 can limit movement of the spool 60 toward a side that is opposite to the sleeve sealing portion 51. In this way, removal of the spool 60 from the inside of the inner sleeve 50 is limited.

The spool 60 is movable in the axial direction from a position, at which the spool 60 contacts the retaining portion 65, to a position, at which the spool 60 contacts the sleeve sealing portion 51. Specifically, a movable range of the spool 60 relative to the sleeve 400 extends from the position, at which the spool 60 contacts the retaining portion 65 (see FIG. 3), to the position, at which the spool 60 contacts the sleeve sealing portion 51. Hereinafter, this movable range of the spool 60 is referred to as a stroke range.

As shown in FIG. 3, the sleeve sealing portion 51 side end part of the inner sleeve 50 has an outer diameter that is smaller than an inner diameter of the outer sleeve 40. In this way, a cylindrical space St1, which is shaped generally in a cylindrical form, is formed between an outer peripheral wall of the sleeve sealing portion 51 side end part of the inner sleeve 50 and the inner peripheral wall of the outer sleeve 40.

Moreover, an annular recess Ht is formed at the inner sleeve 50. The annular recess Ht, which is shaped in an annular form, is radially inwardly recessed at a portion of the outer peripheral wall of the inner sleeve 50, which corresponds to the retaining portion 49. In this way, an annular space St2, which is shaped in an annular form, is formed between the annular recess Ht and the inner peripheral wall of the outer sleeve 40.

A passage groove 52 is also formed at the inner sleeve 50. The passage groove 52 is radially inwardly recessed at the outer peripheral wall of the inner sleeve 50 and extends in the axial direction of the inner sleeve 50. The passage groove 52 forms an axial supply passage RsA. Specifically, the axial supply passage RsA is formed to extend in the axial direction of the sleeve 400 at an interface T1 between the outer sleeve 40 and the inner sleeve 50. One end of the axial supply passage RsA is connected to the cylindrical space St1, and the other end of the axial supply passage RsA is connected to the annular space St2.

Annular grooves 55 are formed at the inner sleeve 50. The annular grooves 55 include a retard annular groove 511 and an advance annular groove 512. The retard annular groove 511 is radially outwardly recessed from a corresponding portion of the inner peripheral wall 54 of the inner sleeve 50, which corresponds to the end part of the cylindrical space St1, while the retard annular groove 511 circumferentially extends in an annular form. The advance annular groove 512 is radially outwardly recessed from a corresponding portion of the inner peripheral wall 54 of the inner sleeve 50, which corresponds to the annular recess Ht, while the advance annular groove 512 circumferentially extends in an annular form.

The sleeve 400 has a plurality of retard supply openings (serving as inflow holes) ORs, a plurality of advance supply openings (serving as inflow holes) OAs, a plurality of retard openings OR and a plurality of advance openings OA.

The retard supply openings ORs are formed to communicate between a bottom surface 550 of the retard annular groove 511 of the inner sleeve 50 and a retard outer wall 531 of an outer wall 53 of the inner sleeve 50, which corresponds to the end part of the cylindrical space St1. In this way, the retard supply openings ORs connect the space, which is located at the inside of the inner sleeve 50, to the cylindrical space St1 and the axial supply passage RsA. The bottom surface 550 of the retard annular groove 511 and the retard outer wall 531 are respectively shaped generally in a cylindrical form.

Figure 4:
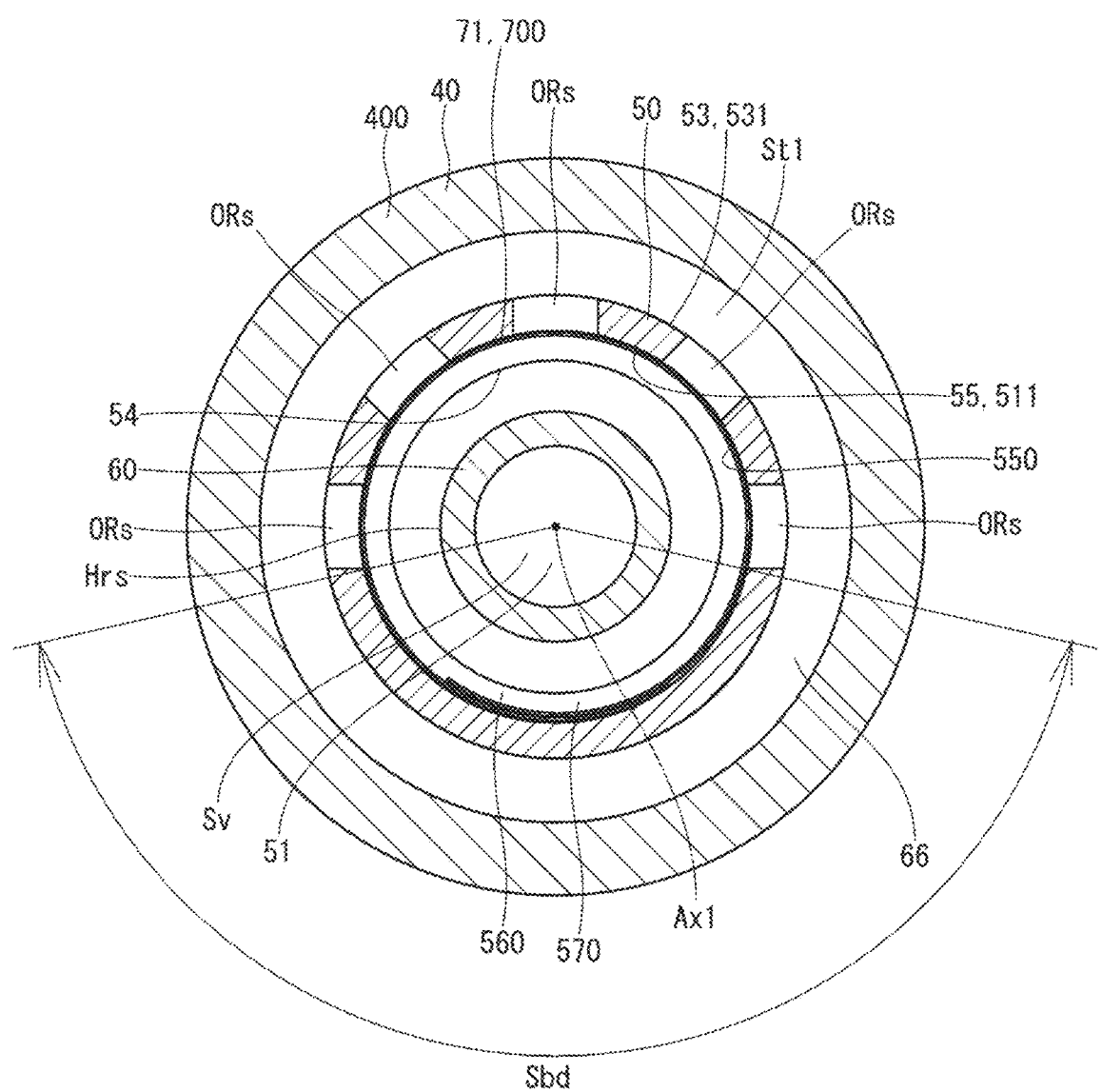
FIG. 4 is a cross-sectional view taken along line IV-IV in FIG. 3.

Furthermore, as shown in FIG. 4, the retard supply openings ORs are arranged one after another in the circumferential direction along the retard annular groove 511. In the present embodiment, the number of the retard supply openings ORs is five. The five retard supply openings ORs are formed such that the first to fifth retard supply openings ORs are arranged at equal intervals, i.e., 45 degree intervals in the circumferential direction, and an interval from the fifth retard supply opening ORs to the first retard supply opening ORs is 180 degrees. Specifically, the retard supply openings ORs are formed in a range approximately half of the entire circumferential extent of the retard annular groove 511. That is, the retard supply openings ORs are localized at a predetermined circumferential range of the retard annular groove 511. As discussed above, the retard supply openings ORs are not uniformly arranged along the entire circumferential extent of the retard annular groove 511.

The advance supply openings OAs are formed to communicate between the bottom surface 550 of the advance annular groove 512 of the inner sleeve 50 and an advance outer wall 532 of the outer wall 53 of the inner sleeve 50, which corresponds to the annular recess Ht. In this way, the advance supply openings OAs connect the space, which is located at the inside of the inner sleeve 50, to the annular space St2 and the axial supply passage RsA. The bottom surface 550 of the advance annular groove 512 and the advance outer wall 532 are respectively shaped generally in a cylindrical form.

Similar to the retard supply openings ORs, the advance supply openings OAs are arranged one after another in the circumferential direction along the advance annular groove 512. In the present embodiment, the number of the advance supply openings OAs is five. The five advance supply openings OAs are formed such that the first to fifth advance supply openings OAs are arranged at equal intervals, i.e., 45 degree intervals in the circumferential direction, and an interval from the fifth advance supply opening OAs to the first advance supply opening OAs is 180 degrees. Specifically, the advance supply openings OAs are formed in a range approximately half of the entire circumferential extent of the advance annular groove 512. That is, the advance supply openings OAs are localized at a predetermined circumferential range of the advance annular groove 512. As discussed above, the advance supply openings OAs are not uniformly arranged along the entire circumferential extent of the advance annular groove 512.

Each retard opening OR extends in the radial direction of the sleeve 400 and connects the space, which is located at the inside of the inner sleeve 50, to the space, which is located at the outside of the outer sleeve 40. The retard openings OR are arranged one after the other in the circumferential direction of the sleeve 400. The retard openings OR are communicated with the retard chambers 201 through retard passages 301.

The advance openings OA extend in the radial direction of the sleeve 400 and connect the space, which is located at the inside of the inner sleeve 50, to the space, which is located at the outside of the outer sleeve 40. The advance openings OA are formed on the retaining portion 49 side of the retard openings OR. The advance openings OA are arranged one after another in the circumferential direction of the sleeve 400. The advance openings OA are communicated with the advance chambers 202 through advance passages 302.

The spool 60 has a retard supply recess HRs, a retard drain recess HRd, an advance drain recess HAd, an advance supply recess HAs, and a plurality of drain openings Od1, Od2. The retard supply recess HRs, the retard drain recess HRd, the advance drain recess HAd and the advance supply recess HAs are respectively shaped in an annular form and radially inwardly recessed from the outer peripheral wall of the spool 60. The retard supply recess HRs, the retard drain recess HRd, the advance drain recess HAd and the advance supply recess HAs are arranged one after another in this order in the axial direction of the spool 60. The retard drain recess HRd and the advance drain recess HAd are formed integrally. The retard drain recess HRd and the advance drain recess HAd form a specific space Ss relative to the inner peripheral wall of the inner sleeve 50. Specifically, the spool 60 forms the specific space Ss between the spool 60 and the sleeve 400.

Each drain opening Od1 communicates the space, which is located at the inside of the spool 60, to the retard drain recess HRd and the advance drain recess HAd, i.e., the specific space Ss. At the spool sealing portion 62 side end part of the spool 60, each drain opening Od2 communicates the space, which is located at the inside of the spool 60, to the space, which is located at the outside of the spool 60. The drain openings Od1 are arranged one after another in the circumferential direction of the spool 60, and the drain openings Od2 are arranged one after another in the circumferential direction of the spool 60.

The retard supply passage RRs connects the oil pump 8 to the retard chambers 201 through the valve device 11. The advance supply passage RAs connects the oil pump 8 to the advance chamber 202 through the valve device 11. The retard drain passage RRd, which serves as the drain passage, connects the retard chambers 201 to the oil pan 7. The advance drain passage RAd, which serves as the drain passage, connects the advance chambers 202 to the oil pan 7.

The retard supply passage RRs connects the oil pump 8 to the retard chambers 201 through the supply hole 101, the shaft hole 100, the cylindrical space St1, the axial supply passage RsA, the retard supply openings ORs, the retard annular groove 511, the retard supply recess HRs, the retard openings OR and the retard passages 301.

The advance supply passage RAs connects the oil pump 8 to the advance chambers 202 through the supply hole 101, the shaft hole 100, the cylindrical space St1, the axial supply passage RsA, the advance supply openings OAs, the advance annular groove 512, the advance supply recess HAs, the advance openings OA, and the advance passage 302.

The retard drain passage RRd connects the retard chambers 201 to the oil pan 7 through the retard passages 301, the retard openings OR, the retard drain recess HRd and the drain openings Od1, Od2.

The advance drain passage RAd connects the advance chambers 202 to the oil pan 7 through the advance passages 302, the advance openings OA, the advance drain recess HAd and the drain openings Od1, Od2. Thus, a portion of each of the retard supply passage RRs, the advance supply passage RAs, the retard drain passage RRd and the advance drain passage RAd is formed at the inside of the valve device 11.

When the spool 60 is in contact with the retaining portion 65 (see FIG. 3), i.e., when the spool 60 is positioned at one end of the stroke range, the spool 60 opens the retard openings OR. Thereby, the oil pump 8 is communicated with the retard chambers 201 through the supply hole 101, the shaft hole 100, the cylindrical space St1, the axial supply passage RsA, the retard supply openings ORs, the retard annular groove 511, the retard supply recess HRs, the retard openings OR and the retard passages 301 of the retard supply passage RRs. As a result, the hydraulic oil can be supplied from the oil pump 8 to the retard chambers 201 through the retard supply passage RRs. Moreover, at this time, the advance chambers 202 are communicated with the oil pan 7 through the advance passages 302, the advance openings OA, the advance drain recess HAd and the drain openings Od1, Od2 of the advance drain passage RAd. As a result, the hydraulic oil can be discharged from the advance chambers 202 to the oil pan 7 through the advance drain passage RAd.

When the spool 60 is positioned between the retaining portion 65 and the sleeve sealing portion 51, i.e., when the spool 60 is positioned in the middle of the stroke range, the oil pump 8 is communicated with the advance chambers 202 through the supply hole 101, the shaft hole 100, the cylindrical space St1, the axial supply passage RsA, the advance supply openings OAs, the advance annular groove 512, the advance supply recess HAs, the advance openings OA and the advance passages 302 of the advance supply passage RAs. At this time, the oil pump 8 is communicated with the retard chambers 201 through the retard supply passage RRs. As a result, the hydraulic oil can be supplied from the oil pump 8 to the retard chambers 201 and the advance chambers 202 through the retard supply passage RRs and the advance supply passage RAs. However, the retard drain passage RRd and the advance drain passage RAd are closed, i.e., are blocked by the spool 60. Therefore, the hydraulic oil is not discharged from the retard chambers 201 and the advance chambers 202 to the oil pan 7.

When the spool 60 is in contact with the sleeve sealing portion 51, i.e., when the spool 60 is positioned at the other end of the stroke range, the retard chambers 201 are communicated with the oil pan 7 through the retard passages 301, the retard openings OR, the retard drain recess HRd and the drain openings Od1, Od2 of the retard drain passage RRd. At this time, the oil pump 8 is communicated with the advance chambers 202 through the advance supply passage RAs. As a result, the hydraulic oil can be discharged from the retard chambers 201 to the oil pan 7 through the retard drain passage RRd, and the hydraulic oil can be supplied from the oil pump 8 to the advance chambers 202 through the advance supply passage RAs.

A filter 66 is installed at an inside of the sleeve sealing portion 51 side end part of the outer sleeve 40, i.e., the filter 66 is installed at the middle of the retard supply passage RRs and the advance supply passage RAs. The filter 66 is, for example, a mesh that is shaped in a circular disk form. The filter 66 can capture foreign objects contained in the hydraulic oil. Therefore, it is possible to limit flow of the foreign objects toward the downstream side of the filter 66, i.e., toward the side that is opposite from the oil pump 8.

Figure 5:
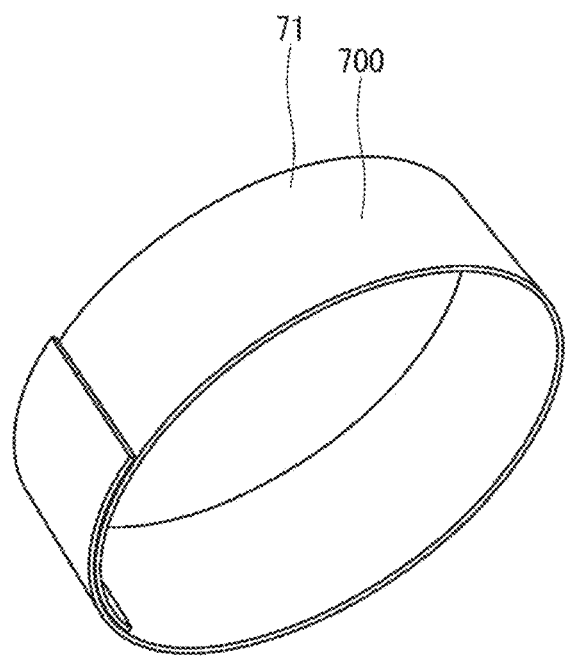
FIG. 5 is a perspective view showing a check valve of the valve device of the first embodiment.

The retard supply check valve 71, which serves as the check valve, has a valve main body 700. The valve main body 700 is made of a single plate material longitudinally elongated and circumferentially wound along a length of the single plate material to have a tubular form. More specifically, the valve main body 700 is made of, for example, a rectangular metal thin plate longitudinally elongated and circumferentially wound along a length of the rectangular metal thin plate to have a cylindrical tubular form. The valve main body 700 is resiliently deformable in a radial direction. FIG. 5 is a perspective view of the retard supply check valve 71. The valve main body 700 is formed such that two opposite end portions of the valve main body 700, which are opposite to each other in the circumferential direction, overlap with each other in the circumferential direction.

The retard supply check valve 71 is installed in the retard annular groove 511 such that the circumferential direction of the valve main body 700 coincides with the circumferential direction of the bottom surface 550 of the retard annular groove 511. The retard supply check valve 71 is configured to enable an inflow of the hydraulic oil into an inside of the inner sleeve 50 through the retard supply openings ORs and limit an outflow of the hydraulic oil from the inside of the inner sleeve 50 into the retard supply openings ORs.

More specifically, when the hydraulic oil flows from the retard supply opening ORs side toward the retard supply recess HRs in the retard supply passage RRs, the valve main body 700 of the retard supply check valve 71 is deformed such that the outer peripheral wall of the valve main body 700 is radially inwardly urged and shrunk by the hydraulic oil, i.e., an inner diameter of the valve main body 700 is reduced. In this way, the outer peripheral wall of the valve main body 700 of the retard supply check valve 71 is spaced away from the retard supply openings ORs and the bottom surface 550 of the retard annular groove 511, and thereby the hydraulic oil can flow toward the retard supply recess HRs through the retard supply check valve 71. At this time, the valve main body 700 maintains the overlapping state, in which the two opposite end portions of the valve main body 700 are overlapped with each other, and an overlapping extent, along with the portions of the valve main body 700 are overlapped with each other, is increased.

When the flow rate of the hydraulic oil flowing through the retard supply passage RRs becomes lower than or equal to a predetermined value, the valve main body 700 of the retard supply check valve 71 is deformed such that the valve main body 700 expands radially outward, i.e., the inner diameter of the valve main body 700 is increased. When the hydraulic oil flows from the retard supply recess HRs side toward the retard supply openings ORs, the inner peripheral wall of the valve main body 700 of the retard supply check valve 71 is radially outwardly urged by the hydraulic oil. Thereby, the outer peripheral wall of the valve main body 700 contacts the retard supply openings ORs and the bottom surface 550 of the retard annular groove 511. In this way, the flow of the hydraulic oil from the retard supply recess HRs side toward the retard supply opening ORs is limited. Here, the bottom surface 550 of the retard annular groove 511 corresponds to a valve seat surface.

As discussed above, the retard supply check valve 71 functions as the check valve such that the retard supply check valve 71 enables the flow of the hydraulic oil from the retard supply opening ORs side toward the retard supply recess HRs and limits the flow of the hydraulic oil from the retard supply recess HRs side toward the retard supply opening ORs.

The advance supply check valve 72 has a valve main body 700 like the retard supply check valve 71. A structure of the valve main body 700 of the advance supply check valve 72 is similar to the structure of the valve main body 700 of the retard supply check valve 71 (see FIG. 5).

The advance supply check valve 72 is installed in the advance annular groove 512 such that the circumferential direction of the valve main body 700 coincides with the circumferential direction of the bottom surface 550 of the advance annular groove 512. The advance supply check valve 72 is configured to enable an inflow of the hydraulic oil into the inside of the inner sleeve 50 through the advance supply openings OAs and limit an outflow of the hydraulic oil from the inside of the inner sleeve 50 into the advance supply openings OAs.

More specifically, when the hydraulic oil flows from the advance supply opening OAs side toward the advance supply recess HAs in the advance supply passage RAs, the valve main body 700 of the advance supply check valve 72 is deformed such that the outer peripheral wall of the valve main body 700 is radially inwardly urged and shrunk by the hydraulic oil, i.e., an inner diameter of the valve main body 700 is reduced. In this way, the outer peripheral wall of the valve main body 700 of the advance supply check valve 72 is spaced away from the advance supply openings OAs and the bottom surface 550 of the advance annular groove 512, and thereby the hydraulic oil can flow toward the advance supply recess HAs through the advance supply check valve 72. At this time, the valve main body 700 maintains the overlapping state, in which the two opposite end portions of the valve main body 700 are overlapped with each other, and an overlapping extent, along with the portions of the valve main body 700 are overlapped with each other, is increased.

When the flow rate of the hydraulic oil flowing through the advance supply passage RAs becomes equal to or smaller than a predetermined value, the valve main body 700 of the advance supply check valve 72 is deformed to expand radially outward, i.e., the inner diameter of the valve main body 700 of the advance supply check valve 72 is increased. Furthermore, when the hydraulic oil flows from the advance supply recess HAs side toward the advance supply openings OAs, the inner peripheral wall of the valve main body 700 of the advance supply check valve 72 is radially outwardly urged by the hydraulic oil. Thereby, the outer peripheral wall of the valve main body 700 contacts the advance supply openings OAs and the bottom surface 550 of the advance annular groove 512. In this way, the flow of the hydraulic oil from the advance supply recess HAs side toward the advance supply opening OAs is limited. Here, the bottom surface 550 of the advance annular groove 512 corresponds to a valve seat surface.

As discussed above, the advance supply check valve 72 functions as a check valve such that the advance supply check valve 72 enables the flow of the hydraulic oil from the advance supply opening OAs side toward the advance supply recess HAs and limits the flow of the hydraulic oil from the advance supply recess HAs side toward the advance supply opening OAs.

Next, the structure of the annular groove 55 will be described in detail. The structure of the advance annular groove 512, which serves as the annular groove 55, is similar to the structure of the retard annular groove 511. Therefore, in the following discussion, only the structure of the retard annular groove 511 is described, and the description of the advance annular groove 512 is omitted for the sake of simplicity.

Figure 6:
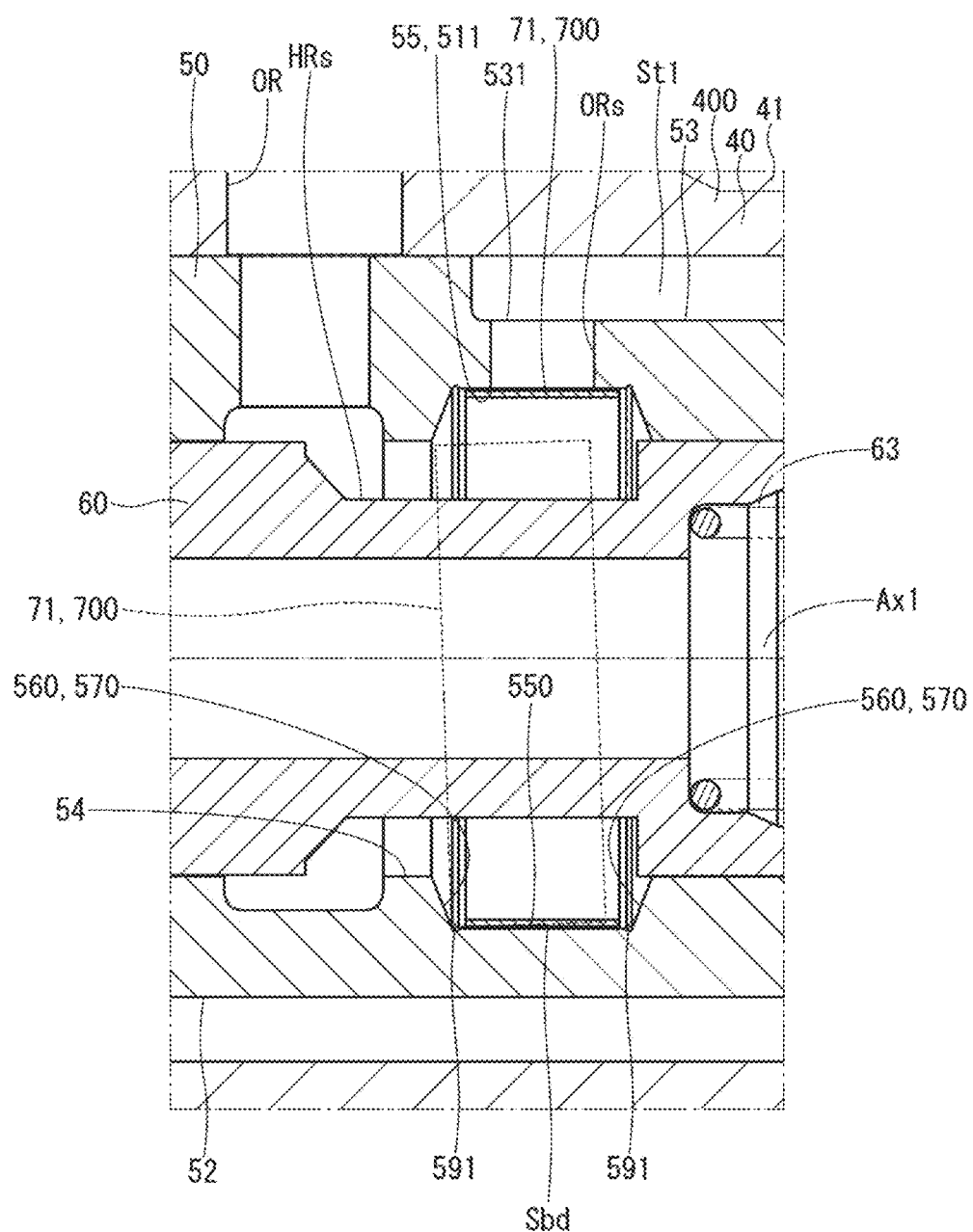
FIG. 6 is a cross-sectional view showing an annular groove of the valve device and an area around the annular groove according to the first embodiment.
Figure 7:
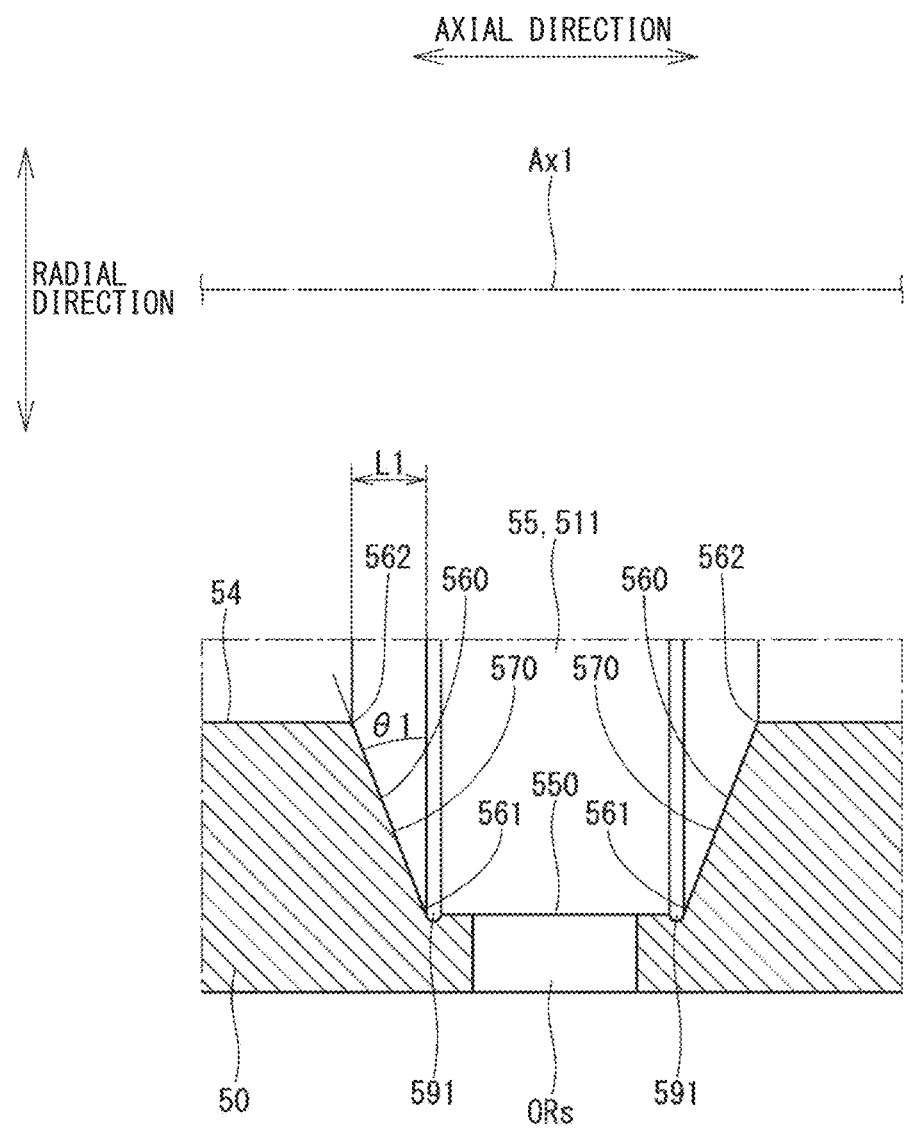
FIG. 7 is a cross-sectional view schematically showing the annular groove of the valve device of the first embodiment.

As shown in FIGS. 6 and 7, the retard annular groove 511, which serves as the annular groove 55, has side peripheral surfaces 560, specific shape surfaces 570 and relief grooves 591.

Each of the side peripheral surfaces 560 is shaped in a ring form and is formed such that the side peripheral surface 560 inwardly extends from the bottom surface 550 in the radial direction of the inner sleeve 50 and is joined to the inner peripheral wall 54. Each of the specific shape surface 570 is formed along at least a part of the corresponding side peripheral surface 560 between a bottom surface side end part 561 and an inner peripheral wall side end part 562 of the corresponding side peripheral surface 560 such that a diameter of the specific shape surface 570 is progressively reduced in an axial direction of the inner sleeve 50 from one axial side, at which the bottom surface 550 is placed, toward another axial side, at which the inner peripheral wall 54 is placed. The bottom surface side end part 561 is one end part of the corresponding side peripheral surface 560 located at one radial side where the bottom surface 550 is placed, and the inner peripheral wall side end part 562 is another end part of the corresponding side peripheral surface 560 located at another radial side where the inner peripheral wall 54 is placed.

Furthermore, in the present embodiment, the specific shape surface 570 extends along the side peripheral surface 560 from the bottom surface side end part 561 to the inner peripheral wall side end part 562 in the radial direction such that an outer peripheral end of the specific shape surface 570 is joined to the bottom surface 550, and an inner peripheral end of the specific shape surface 570 is joined to the inner peripheral wall 54. Specifically, the specific shape surface 570 is formed along the entire extent of the side peripheral surface 560 between the bottom surface side end part 561 and the inner peripheral wall side end part 562.

Furthermore, in the present embodiment, the specific shape surface 570 is formed such that a diameter reduction rate, which is a degree of a diameter reduction of the specific shape surface 570, is constant from the one radial side where the bottom surface 550 is placed toward the other radial side where the inner peripheral wall 54 is placed. Specifically, the specific shape surface 570 is tapered such that the specific shape surface 570 is tilted relative to an axis Ax1 of the inner sleeve 50.

Furthermore, in the present embodiment, the specific shape surface 570 is formed such that an angle 81 of the specific shape surface 570 relative to a plane, which is perpendicular to the axis Ax1 of the inner sleeve 50, is equal to or smaller than 60 degrees (see FIG. 7).

Furthermore, in the present embodiment, a length L1 of the specific shape surface 570, which is measured in the axial direction of the inner sleeve 50, is equal to or larger than 0.4 mm (see FIG. 7).

Each of the relief grooves 591 is shaped in an annular form and is formed at a corresponding end part of the bottom surface 550, which is located on an axial side where the corresponding side peripheral surface 560 is placed in the axial direction, such that the relief groove 591 is recessed from the bottom surface 550 toward the outer side in the radial direction of the inner sleeve 50.

With the above construction, at the valve opening time of the retard supply check valve 71, a diameter of the valve main body 700 may possibly be reduced to such an extent that a portion of the outer peripheral wall of the valve main body 700 is placed on an inner side of the inner peripheral wall 54 of the inner sleeve 50. In this state, in a case where the retard supply check valve 71 is tilted at the inside of the annular groove 55 (see FIG. 6), when the diameter of the valve main body 700 is increased in response to valve closing of the retard supply check valve 71, an axial end part of the outer peripheral wall of the valve main body 700 contacts the specific shape surface 570. When the diameter of the valve main body 700 is further increased, the axial end part of the outer peripheral wall of the valve main body 700 is slid along the specific shape surface 570 and is moved toward the bottom surface 550. As discussed above, in the present embodiment, since each annular groove 55 has the specific shape surface 570, the movement of the outer peripheral wall of the valve main body 700 toward the bottom surface 550 is guided by the specific shape surface 570 without resulting in collision of the outer peripheral wall of the valve main body 700 against the inner peripheral wall 54 of the inner sleeve 50 at the valve closing time of the valve main body 700.

As discussed above, according to the present embodiment, the specific shape surface 570 is formed such that the angle 61 of the specific shape surface 570 relative to the plane, which is perpendicular to the axis Ax1 of the inner sleeve 50, is equal to or smaller than 60 degrees. Therefore, when the movement of the valve main body 700 toward the bottom surface 550 is guided by the specific shape surface 570 at the valve closing time of the valve main body 700, the valve main body 700 can be limited from being caught and stopped in the middle of the specific shape surface 570.

In the present embodiment, the retard supply openings ORs are localized at the predetermined circumferential range of the retard annular groove 511. Therefore, when the hydraulic oil flows from the retard supply openings ORs into the inside of the inner sleeve 50, the valve main body 700 is placed in the valve opening state after the diameter of the valve main body 700 is reduced, and the valve main body 700 is urged to a portion of the bottom surface 550 of the retard annular groove 511, which corresponds to a longest interval Sbd (see FIG. 6). At this time, the axial end part of the valve main body 700 contacts the bottom surface side end part 561 of the side peripheral surface 560, so that the axial movement of valve main body 700 is limited.

Furthermore, in the present embodiment, the relief grooves 591 are respectively formed at the end parts of the bottom surface 550, each of which is located on the axial side where the corresponding side peripheral surface 560 is placed. Therefore, even when the axial end part of the valve main body 700 contacts the bottom surface side end part 561 of the side peripheral surface 560, the outer peripheral wall of the valve main body 700 can be kept in close contact with the bottom surface 550. Therefore, regardless of the axial position of the valve main body 700 in each annular groove 55, the leakage of the hydraulic oil at the valve closing time can be limited.

Next, with reference to FIG. 8, there will be described a reason why the length L1 of the specific shape surface 570 measured in the axial direction of the inner sleeve 50 is set to be equal to or larger than 0.4 mm.

Figure 8:
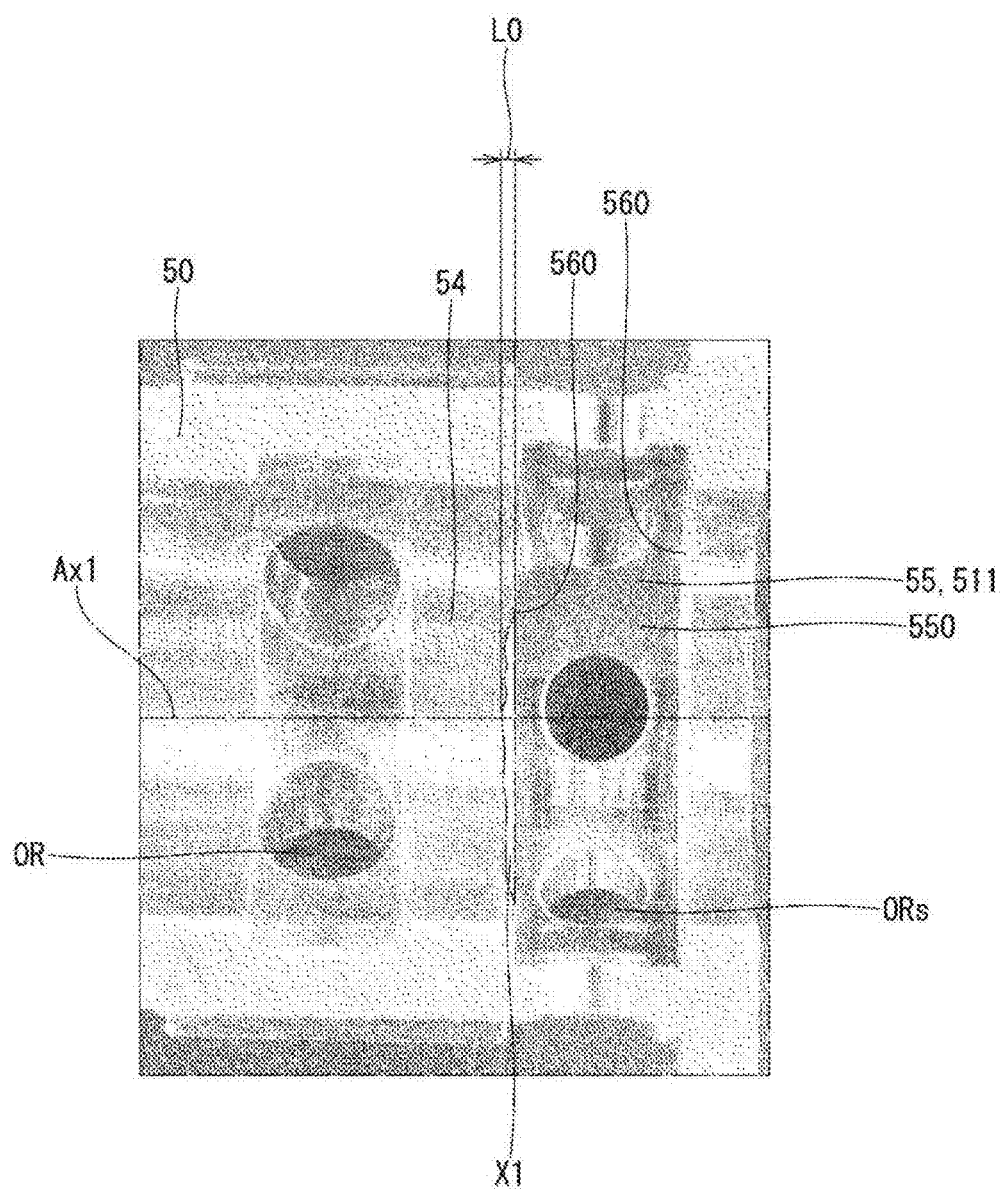
FIG. 8 is a photograph showing a cross section of a tubular member of a valve device after a durability test.

FIG. 8 is a photograph showing a cross section of the inner sleeve 50 after execution of a durability test of a valve device under predetermined conditions. In this valve device, each of the side peripheral surfaces 560 of the annular groove 55 is perpendicular to the axis Ax1 of the inner sleeve 50. Specifically, in the valve device subjected to the durability test, the specific shape surfaces 570 are not formed at the annular groove 55. The predetermined conditions of the durability test are as follows.

Engine Used for Test: 1.2 L Inline 4-cylinder Engine
Type of Hydraulic Oil: 5 W-30
Hydraulic Oil Temperature: 120 degrees Celsius
Supply Oil Pressure: 200 kPa
Engine Rotational Speed: 1000 rpm
Number of Check Valve Opening/Closing Operations: 2.66 million times As shown in FIG. 8, after the execution of the durability test, it is found that a collision trace X1, which is generated by the collision of the retard supply check valve 71, is left at an end part of the inner peripheral wall 54 of the inner sleeve 50, which is located on the side where the annular groove 55 is placed. A length L0 of the collision trace X1, which is measured in the axial direction of the inner sleeve 50, is about 0.37 mm. After the execution of the durability test, it is found that the retard supply check valve 71 is damaged.

In the present embodiment, in view of the result of the durability test, the length L1 of each specific shape surface 570, which is measured in the axial direction of the inner sleeve 50, is set to be equal to or smaller than 0.4 mm. With this setting, according to the present embodiment, it is possible to reliably limit the collision of the outer peripheral wall of the valve main body 700 against the inner peripheral wall 54 of the inner sleeve 50 at the valve closing time of the valve main body 700.

A linear solenoid 9 is located on a side of the spool 60, which is opposite to the camshaft 3. The linear solenoid 9 is configured to contact the spool sealing portion 62. When the linear solenoid 9 is energized, the linear solenoid 9 urges the spool 60 toward the camshaft 3 through the spool sealing portion 62 against the urging force of the spring 63. As a result, the position of the spool 60 in the axial direction with respect to the sleeve 400 changes in the stroke range.

The variable volume space Sv is communicated with the retard drain passage RRd and the advance drain passage RAd. The variable volume space Sv is thus opened to the atmosphere through the drain openings Od2 of the retard drain passage RRd and the advance drain passage RAd. As a result, the pressure in the variable volume space Sv can be made equal to the atmospheric pressure. This allows for smooth movement of the spool 60 in the axial direction.

In the present embodiment, there is further provided a lock pin 33 (see FIGS. 1 and 2). The lock pin 33 is shaped in a bottomed cylindrical tubular form. The lock pin 33 is received in a receiving hole 321 formed at the corresponding vane 32 in such a manner that the lock pin 33 can axially reciprocate in the receiving hole 321. A spring 34 is installed in an inside of the lock pin 33. The spring 34 urges the lock pin 33 toward the plate portion 222 of the case 22. A fitting recess 25 is formed at the plate portion 222 of the case 22 on the vane 32 side of the plate portion 222.

The lock pin 33 can be fitted into the fitting recess 25 when the vane rotor 30 is held at a most retarded position with respect to the housing 20. When the lock pin 33 is fitted into the fitting recess 25, relative rotation of the vane rotor 30 relative to the housing 20 is limited. In contrast, when the lock pin 33 is not fitted into the fitting recess 25, the relative rotation of the vane rotor 30 relative to the housing 20 is enabled.

A pin control passage 304, which is communicated with a corresponding one of the advance chambers 202, is formed in the vane 32 at a location between the lock pin 33 and the advance chamber 202 (see FIG. 2). The pressure of the hydraulic oil, which flows from the advance chamber 202 into the pin control passage 304, is exerted against the lock pin 33 in a removing direction for removing the lock pin 33 from the fitting recess 25 against the urging force of the spring 34.

In the valve timing adjustment device 10 constructed in the above-described manner, when the hydraulic oil is supplied to the advance chambers 202, the hydraulic oil flows into the pin control passage 304. Thereby, the lock pin 33 is removed from the fitting recess 25, and thereby the relative rotation of the vane rotor 30 relative to the housing 20 is enabled.

Next, the operation of the valve timing adjustment device 10 will be described. The valve timing adjustment device 10 drives the valve device 11 among a first operating state, a second operating state and a phase holding state when the linear solenoid 9 is driven to urge the spool 60 of the valve device 11. In the first operating state of the valve device 11, the oil pump 8 is connected to the retard chambers 201, and the advance chambers 202 are connected to the oil pan 7. In the second operating state of the valve device 11, the oil pump 8 is connected to the advance chambers 202, and the retard chambers 201 are connected to the oil pan 7. In the phase holding state of the valve device 11, the oil pump 8 is connected to the retard chambers 201 and the advance chambers 202, and the connection of the retard chambers 201 to the oil pan 7 and the connection of the advance chambers 202 to the oil pan 7 are blocked to maintain the current phase of the phase converter PC.

In the first operating state, the hydraulic oil is supplied to the retard chambers 201 through the retard supply passage RRs, and the hydraulic oil is returned from the advance chambers 202 to the oil pan 7 through the advance drain passage RAd. In the second operating state, the hydraulic oil is supplied to the advance chambers 202 through the advance supply passage RAs, and the hydraulic oil is returned from the retard chambers 201 to the oil pan 7 through the retard drain passage RRd. In the phase holding state, the hydraulic oil is supplied to the retard chambers 201 and the advance chambers 202 through the retard supply passage RRs and the advance supply passage RAs, and the discharge of the hydraulic oil from the retard chambers 201 and the advance chambers 202 is limited.

The valve timing adjustment device 10 brings the valve device 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjustment device 10 brings the valve device 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjustment device 10 brings the valve device 11 into the phase holding state when the rotational phase of the camshaft 3 coincides with the target value. In this way, the rotational phase of the camshaft 3 is maintained.

As described above, the valve device 11 of the present embodiment includes the inner sleeve 50, which serves as the tubular member, and the retard supply check valve 71 and the advance supply check valve 72, which respectively serve as the check valve. The inner sleeve 50 has the retard annular groove 511 and the advance annular groove 512

(respectively serving as the annular groove 55) and the retard supply openings ORs and the advance supply openings OAs (respectively serving as the inflow hole). Each of the retard annular groove 511 and the advance annular groove 512 is radially outwardly recessed from the inner peripheral wall 54 of the inner sleeve 50 and circumferentially extends in the annular form. Each of the retard supply openings ORs and the advance supply openings OAs communicates between the outer wall 53 and the cylindrical bottom surface 550 of the corresponding one of the retard annular groove 511 and the advance annular groove 512. Each of the retard supply check valve 71 and the advance supply check valve 72 has the valve main body 700 that is made of the single plate material longitudinally elongated and circumferentially wound along the length of the single plate material to have the tubular form. Furthermore, each of the retard supply check valve 71 and the advance supply check valve 72 is installed in the corresponding one of the retard annular groove 511 and the advance annular groove 512 such that the circumferential direction of the valve main body 700 coincides with the circumferential direction of the bottom surface 550 of the corresponding one of the retard annular groove 511 and the advance annular groove 512. Additionally, each of the retard supply check valve 71 and the advance supply check valve 72 is configured to enable the inflow of the hydraulic oil into the inside of the inner sleeve 50 through the retard supply openings ORs or the advance supply openings OAs and limit the outflow of the hydraulic oil from the inside of the inner sleeve 50 into the retard supply openings ORs or the advance supply openings OAs.

The annular groove 55 has the side peripheral surfaces 560 and the specific shape surfaces 570. Each of the side peripheral surfaces 560 is shaped in the ring form and is formed such that the side peripheral surface 560 inwardly extends from the bottom surface 550 in the radial direction of the inner sleeve 50 and is joined to the inner peripheral wall 54 of the inner sleeve 50. Each of the specific shape surfaces 570 is formed along at least the part of the corresponding side peripheral surface 560 between the bottom surface side end part 561, which is the one end part of the side peripheral surface 560 located at the one radial side where the bottom surface 550 is placed, and the inner peripheral wall side end part 562, which is the another end part of the side peripheral surface 560 located at the other radial side where the inner peripheral wall 54 is placed, such that the diameter of the specific shape surface 570 is progressively reduced in the axial direction of the inner sleeve 50 from the one axial side, at which the bottom surface 550 is placed, toward the other axial side, at which the inner peripheral wall 54 is placed.

At the valve opening time of the retard supply check valve 71 or the advance supply check valve 72, the diameter of the valve main body 700 may be reduced to such an extent that the portion of the outer peripheral wall of the valve main body 700 is placed on the inner side of the inner peripheral wall 54 of the inner sleeve 50. In this state, in the case where the retard supply check valve 71 or the advance supply check valve 72 is tilted at the inside of the annular groove 55, when the diameter of the valve main body 700 is increased in response to the valve closing of the retard supply check valve 71 or the advance supply check valve 72, the axial end part of the outer peripheral wall of the valve main body 700 contacts the specific shape surface 570. When the diameter of the valve main body 700 is further increased, the axial end part of the outer peripheral wall of the valve main body 700 is slid along the specific shape surface 570 and is moved toward the bottom surface 550. As discussed above, in the present embodiment, since each annular groove 55 has the specific shape surfaces 570, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55. Thus, it is possible to limit the damage of the valve main body 700 or the inner peripheral wall 54 of the inner sleeve 50.

Furthermore, according to the present embodiment, the collision of the valve main body 700 against the inner peripheral wall 54 of the inner sleeve 50 can be limited by the specific shape surface 570. Therefore, it is not required to increase the spring constant of the valve main body 700 by increasing the plate thickness of the valve main body 700 to limit the decrease of the diameter of the valve main body 700 to such an extent that the portion of the outer peripheral wall of the valve main body 700 is placed on the inner side of the inner peripheral wall 54 of the inner sleeve 50 at the valve opening time of the retard supply check valve 71 or the advance supply check valve 72. As a result, the damage of the valve main body 700 or the inner peripheral wall 54 of the inner sleeve 50 can be limited while limiting the pressure loss of the hydraulic oil, which flows toward the inside of the inner sleeve 50 through the retard supply openings ORs or the advance supply openings OAs and also limiting the reduction of the flow rate of the hydraulic oil.

Furthermore, in the present embodiment, the specific shape surface 570 extends along the side peripheral surface 560 from the bottom surface side end part 561 to the inner peripheral wall side end part 562 in the radial direction such that an outer peripheral end of the specific shape surface 570 is joined to the bottom surface 550, and an inner peripheral end of the specific shape surface 570 is joined to the inner peripheral wall 54. Therefore, it is possible to minimize the tilt (8) of the specific shape surface 570 relative to the length (L1) of the specific shape surface 570 in the axial direction of the inner sleeve 50, and thereby it is possible to minimize the collision load at the time of occurrence of the collision between the valve main body 700 and the specific shape surface 570.

Furthermore, in the present embodiment, the specific shape surface 570 is formed such that the diameter reduction rate, which is the degree of the diameter reduction of the specific shape surface 570, is constant from the one radial side where the bottom surface 550 is placed toward the other radial side where the inner peripheral wall 54 is placed. Therefore, the specific shape surface 570 can be relatively and easily formed.

Furthermore, in the present embodiment, the annular groove 55 has the relief grooves 591, each of which is shaped in the annular form and is formed at the corresponding end part of the bottom surface 550 located on the axial side where the corresponding side peripheral surface 560 is placed in the axial direction such that the relief groove 591 is recessed from the bottom surface 550 toward the outer side in the radial direction of the inner sleeve 50. Therefore, even when the axial end part of the valve main body 700 contacts the bottom surface side end part 561 of the side peripheral surface 560, the outer peripheral wall of the valve main body 700 can be kept in close contact with the bottom surface 550. Therefore, regardless of the axial position of the valve main body 700 in each annular groove 55, the leakage of the hydraulic oil at the valve closing time can be limited.

Furthermore, in the present embodiment, the length of the specific shape surface 570, which is measured in the axial direction of the inner sleeve 50, is equal to or larger than 0.4 mm. With this setting, it is possible to reliably limit the collision of the outer peripheral wall of the valve main body 700 against the inner peripheral wall 54 of the inner sleeve 50 at the valve closing time of the valve main body 700.

Furthermore, in the present embodiment, the retard supply openings ORs and the advance supply openings OAs (serving as the inflow holes) are not uniformly arranged along the corresponding annular groove 55 in the circumferential direction. Specifically, the retard supply openings ORs and the advance supply openings OAs are localized at the predetermined circumferential range of the annular groove 55. Therefore, when the hydraulic oil flows from the retard supply openings ORs or the advance supply openings OAs into the inside of the inner sleeve 50, the valve main body 700 is placed in the valve opening state after the diameter of the valve main body 700 is reduced, and the valve main body 700 is urged against the portion of the bottom surface 550 of the retard annular groove 55, which corresponds to the longest interval Sbd. At this time, the axial end part of the valve main body 700 contacts the bottom surface side end part 561 of the side peripheral surface 560, so that the axial movement of valve main body 700 is limited. As described above, in the present embodiment, the axial positional deviation of the valve main body 700 at the valve opening time of the valve main body 700 can be limited.

Second Embodiment

Figure 9:
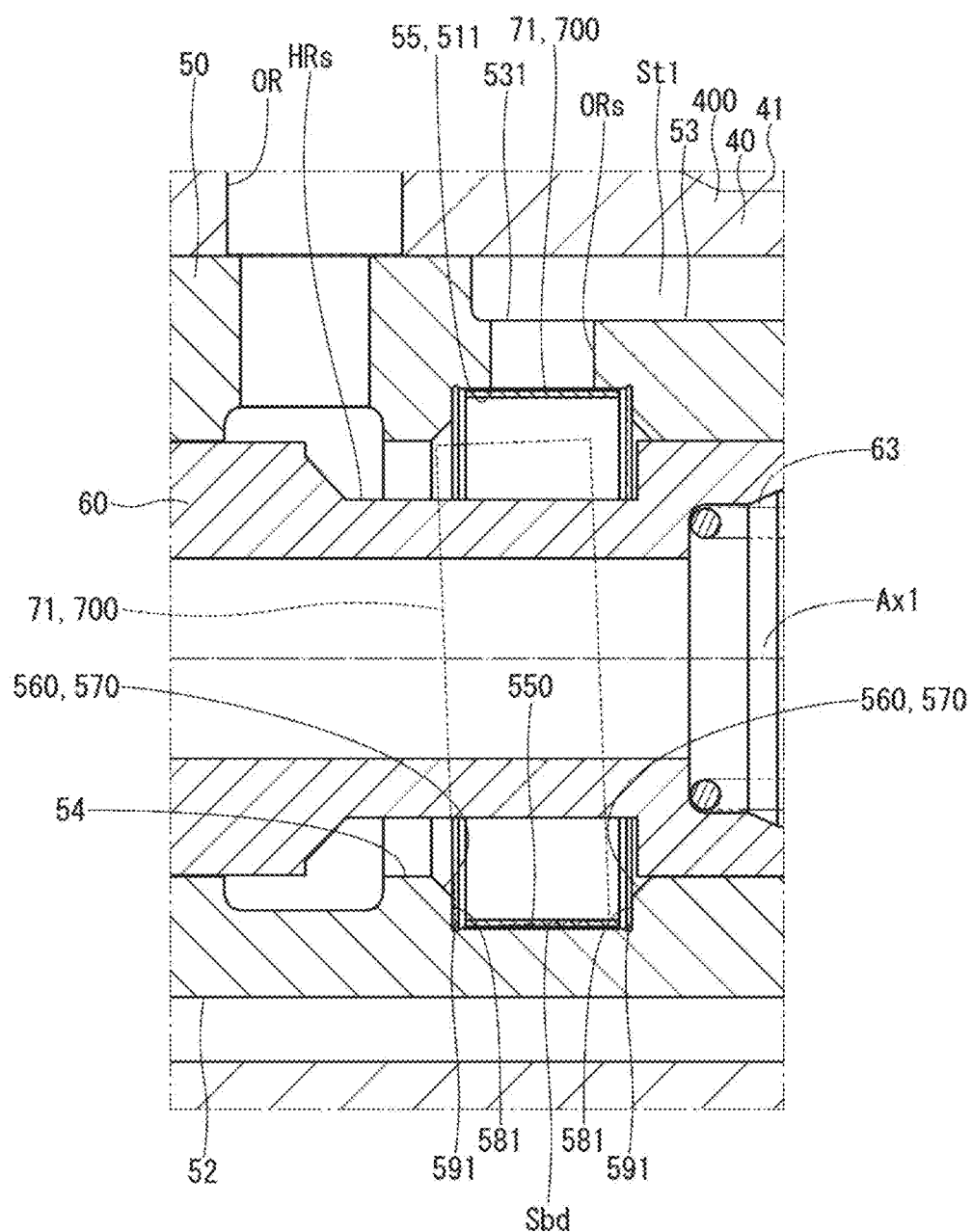
FIG. 9 is a cross-sectional view showing an annular groove of a valve device and an area around the annular groove according to a second embodiment.
Figure 10:
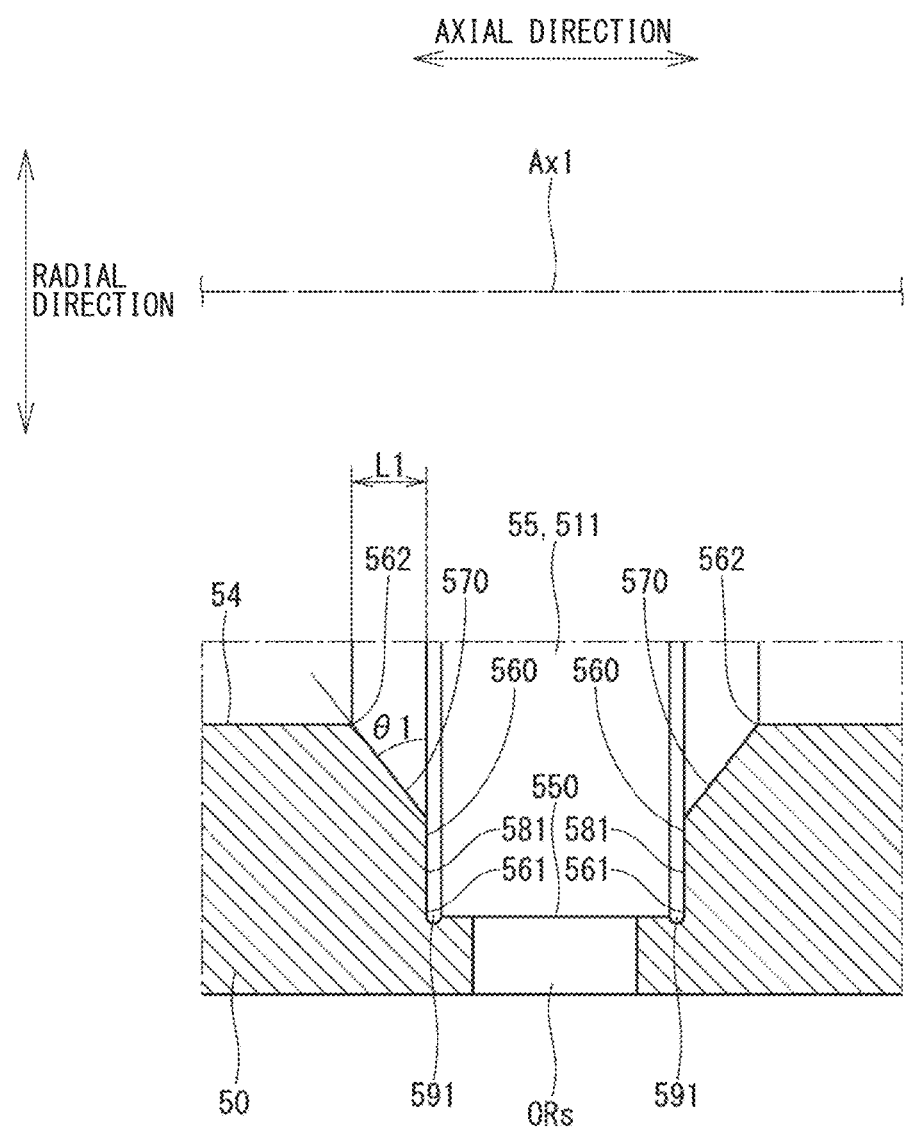
FIG. 10 is a cross-sectional view schematically showing the annular groove of the valve device of the second embodiment.

FIGS. 9 and 10 show a portion of a valve device according to a second embodiment. The second embodiment differs from the first embodiment with respect to the structure of the annular groove 55.

In the second embodiment, each annular groove 55 has perpendicular surfaces 581. Each of the perpendicular surfaces 581 is shaped in a ring form and is formed at a corresponding part of the corresponding side peripheral surface 560 between the bottom surface side end part 561 and the inner peripheral wall side end part 562 such that the perpendicular surface 581 is perpendicular to the axis Ax1 of the inner sleeve 50. The perpendicular surface 581 is formed at the one radial side of the corresponding side peripheral surface 560 where the bottom surface 550 is placed such that an outer peripheral end of the perpendicular surface 581 is joined to the bottom surface 550. Each specific shape surface 570 is formed at the other radial side of the corresponding side peripheral surface 560 where the inner peripheral wall 54 is placed such that the outer peripheral end of the specific shape surface 570 is joined to the perpendicular surface 581, and the inner peripheral end of the specific shape surface 570 is joined to the inner peripheral wall 54.

Other than the points described above, the structure of the second embodiment is similar to that of the first embodiment. In the second embodiment, since each annular groove 55 has the specific shape surfaces 570 like in the first embodiment, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

As described above, according to the present embodiment, each annular groove 55 has the perpendicular surfaces 581. Each perpendicular surface 581 is shaped in the ring form and is formed at the corresponding part of the corresponding side peripheral surface 560 between the bottom surface side end part 561 and the inner peripheral wall side end part 562 such that the perpendicular surface 581 is perpendicular to the axis Ax1 of the inner sleeve 50. The perpendicular surface 581 is formed at the one radial side of the corresponding side peripheral surface 560 where the bottom surface 550 is placed such that an outer peripheral end of the perpendicular surface 581 is joined to the bottom surface 550. Each specific shape surface 570 is formed at the other radial side of the corresponding side peripheral surface 560 where the inner peripheral wall 54 is placed such that the outer peripheral end of the specific shape surface 570 is joined to the perpendicular surface 581, and the inner peripheral end of the specific shape surface 570 is joined to the inner peripheral wall 54.

In the present embodiment, the perpendicular surface 581 is formed at the one radial side of the corresponding side peripheral surface 560 where the bottom surface 550 is placed. Therefore, in the valve closing state of the check valve, the two axial opposite end parts of the valve main body 700, which are opposite to each other in the axial direction, are placed between the two perpendicular surfaces 581, which are opposed to each other. Therefore, in comparison to the case where the specific shape surface 570 is formed at the one radial side of the side peripheral surface 560 where the bottom surface 550 is placed, it is possible to limit the valve closing of the check valve in a state where the valve main body 700 partially rides on the specific shape surface 570. Furthermore, the specific shape surface 570 extends toward the inner peripheral wall 54 and is directly joined to the inner peripheral wall 54, so that the tilt (the angle relative to the plane that is perpendicular to the axis Ax1) of the specific shape surface 570 can be kept small.

Third Embodiment

Figure 11:
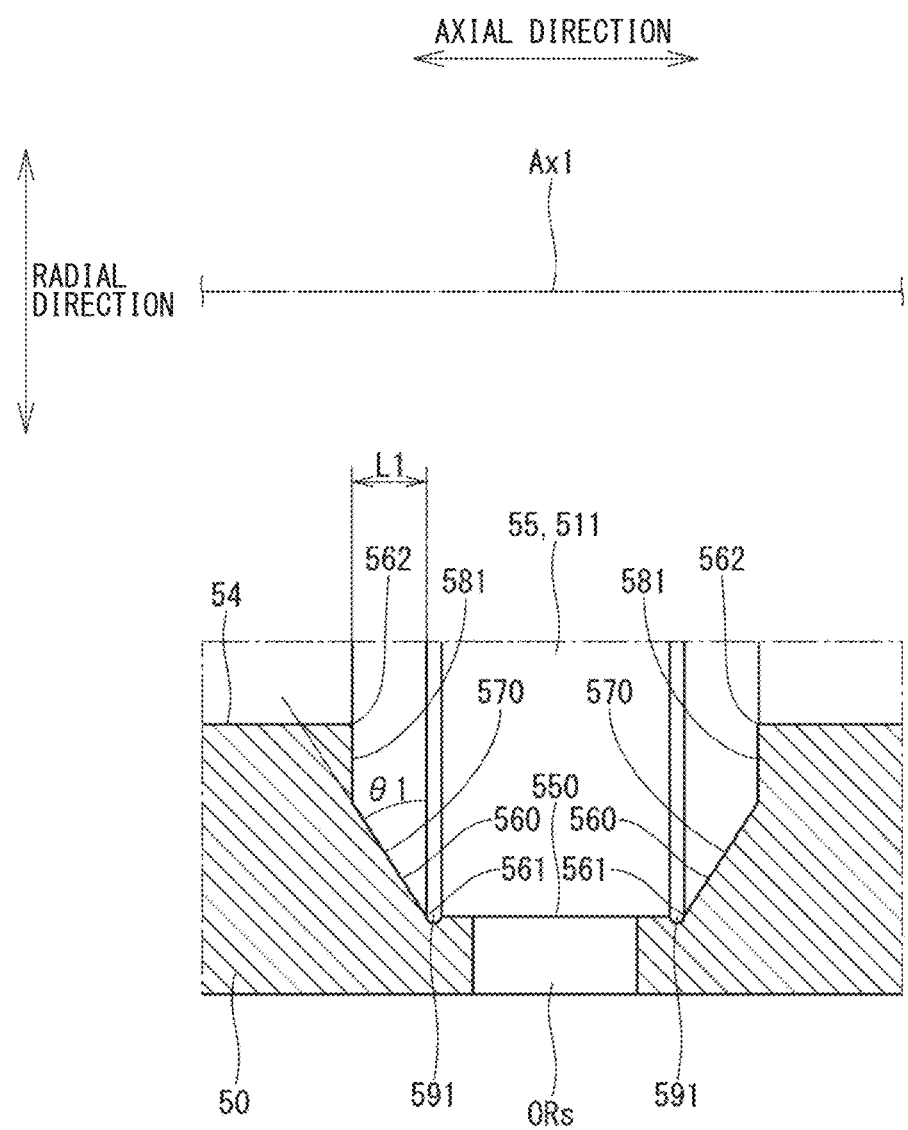
FIG. 11 is a cross-sectional view schematically showing an annular groove of a valve device of a third embodiment.

FIG. 11 shows a portion of a valve device according to a third embodiment. The third embodiment differs from the second embodiment with respect to the structure of the annular groove 55.

In the third embodiment, each of the perpendicular surfaces 581 is formed at the other radial side of the side peripheral surface 560 where the inner peripheral wall 54 is placed such that the inner peripheral end of the perpendicular surface 581 is joined to the inner peripheral wall 54. Each specific shape surface 570 is formed at the one radial side of the corresponding side peripheral surface 560 where the bottom surface 550 is placed such that the outer peripheral end of the specific shape surface 570 is joined to the bottom surface 550, and the inner peripheral end of the specific shape surface 570 is joined to the perpendicular surface 581.

Other than the points described above, the structure of the third embodiment is similar to that of the second embodiment. In the third embodiment, since each annular groove 55 has the specific shape surfaces 570 like in the second embodiment, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

In the present embodiment, each of the perpendicular surfaces 581 is formed at the other radial side of the corresponding side peripheral surface 560 where the inner peripheral wall 54 is placed such that the inner peripheral end of the perpendicular surface 581 is joined to the inner peripheral wall 54. Each specific shape surface 570 is formed at the one radial side of the corresponding side peripheral surface 560 where the bottom surface 550 is placed such that the outer peripheral end of the specific shape surface 570 is joined to the bottom surface 550, and the inner peripheral end of the specific shape surface 570 is joined to the perpendicular surface 581.

In the present embodiment, each specific shape surface 570 is formed at the one radial side of the corresponding side peripheral surface 560 where the bottom surface 550 is placed. Therefore, a cross sectional area of a flow passage at the valve opening time of the valve main body 700 can be increased, and thereby the pressure loss can be reduced. Furthermore, the specific shape surface 570 extends toward the bottom surface 550 and is directly joined to the bottom surface 550, so that the tilt (the angle relative to the plane that is perpendicular to the axis Ax1) of the specific shape surface 570 can be kept small.

Fourth Embodiment

Figure 12:
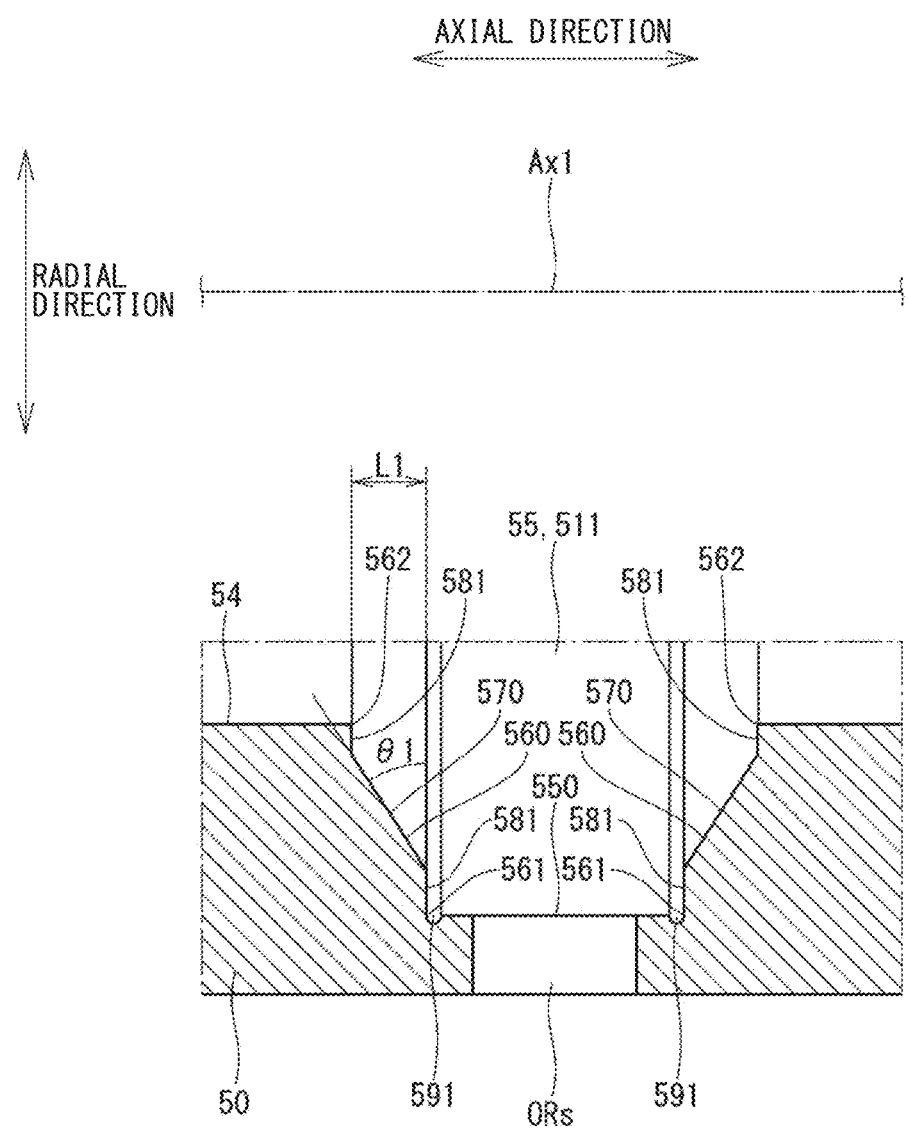
FIG. 12 is a cross-sectional view schematically showing an annular groove of a valve device of a fourth embodiment.

FIG. 12 shows a portion of a valve device according to a fourth embodiment. The fourth embodiment differs from the second and third embodiments with respect to the structure of the annular groove 55.

In the fourth embodiment, the annular groove 55 has two perpendicular surfaces 581 at each side peripheral surface 560. Each of the two perpendicular surfaces 581 is shaped in a ring form and is formed at a corresponding part of the side peripheral surface 560 between the bottom surface side end part 561 and the inner peripheral wall side end part 562 such that the perpendicular surface 581 is perpendicular to the axis Ax1 of the inner sleeve 50. One of the two perpendicular surfaces 581 is formed at the one radial side of the side peripheral surface 560 where the bottom surface 550 is placed such that the outer peripheral end of the perpendicular surface 581 is joined to the bottom surface 550. The other one of the two perpendicular surfaces 581 is formed at the other radial side of the side peripheral surface 560 where the inner peripheral wall 54 is placed such that the inner peripheral end of the perpendicular surface 581 is joined to the inner peripheral wall 54. The specific shape surface 570 is formed at the side peripheral surface 560 such that the outer peripheral end of the specific shape surface 570 is joined to the one of the two perpendicular surfaces 581 (i.e., the perpendicular surface 581 placed on the bottom surface 550 side), and the inner peripheral end of the specific shape surface 570 is joined to the other one of the two perpendicular surfaces 581 (i.e., the perpendicular surface 581 placed on the inner peripheral wall 54 side).

The fourth embodiment is a combination of the second and third embodiments. In the fourth embodiment, since each annular groove 55 has the specific shape surfaces 570 like in the second and third embodiments, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

As described above, according to the present embodiment, each annular groove 55 has two perpendicular surfaces 581 at each side peripheral surface 560. Each perpendicular surface 581 is shaped in the ring form and is formed at the corresponding part of the corresponding side peripheral surface 560 between the bottom surface side end part 561 and the inner peripheral wall side end part 562 such that the perpendicular surface 581 is perpendicular to the axis Ax1 of the inner sleeve 50. The one of the two perpendicular surfaces 581 is formed at the one radial side of the side peripheral surface 560 where the bottom surface 550 is placed such that the outer peripheral end of the perpendicular surface 581 is joined to the bottom surface 550. The other one of the two perpendicular surfaces 581 is formed at the other radial side of the side peripheral surface 560 where the inner peripheral wall 54 is placed such that the inner peripheral end of the perpendicular surface 581 is joined to the inner peripheral wall 54. The specific shape surface 570 is formed at each side peripheral surface 560 such that the outer peripheral end of the specific shape surface 570 is joined to the one of the two perpendicular surfaces 581, and the inner peripheral end of the specific shape surface 570 is joined to the other one of the two perpendicular surfaces 581.

In the present embodiment, it is possible to achieve the advantage of limiting the valve closing of the check valve in the state where the valve main body 700 partially rides on the specific shape surface 570 achieved in the second embodiment and the advantage of reducing the pressure loss at the valve opening time of the valve main body 700 achieved in the third embodiment.

Fifth Embodiment

Figure 13:
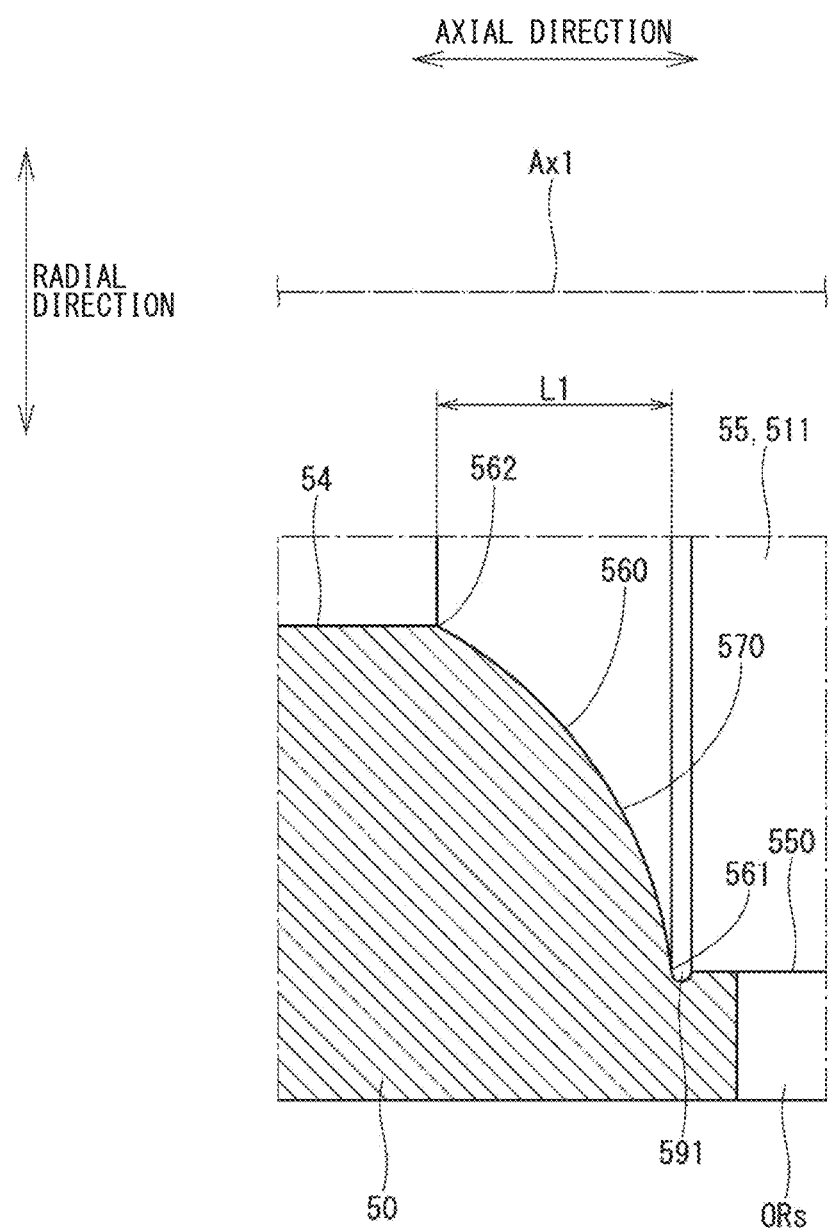
FIG. 13 is a cross-sectional view schematically showing an annular groove of a valve device of a fifth embodiment.

FIG. 13 shows a portion of a valve device according to a fifth embodiment. The fifth embodiment differs from the first embodiment with respect to the structure of the annular groove 55.

In the fifth embodiment, each specific shape surface 570 is formed such that a diameter reduction rate, which is a degree of a diameter reduction of the specific shape surface 570, is progressively reduced from the one radial side of the side peripheral surface 560 where the bottom surface 550 is placed toward the other radial side of the side peripheral surface 560 where the inner peripheral wall 54 is placed while the specific shape surface 570 is convex toward the inner side in the radial direction of the inner sleeve 50. As shown in FIG. 13, in a cross section taken along a plane that includes the entire axis Ax1 of the inner sleeve 50, the specific shape surface 570 is shaped in a form of a smooth arc that is convex toward the inner side in the radial direction of the inner sleeve 50.

Other than the points described above, the structure of the fifth embodiment is similar to that of the first embodiment. In the fifth embodiment, since each annular groove 55 has the specific shape surfaces 570 like in the first embodiment, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

As discussed above, in the present embodiment, each specific shape surface 570 is formed such that the diameter reduction rate, which is the degree of the diameter reduction of the specific shape surface 570, is progressively reduced from the one radial side of the side peripheral surface 560 where the bottom surface 550 is placed toward the other radial side of the side peripheral surface 560 where the inner peripheral wall 54 is placed while the specific shape surface 570 is convex toward the inner side in the radial direction of the inner sleeve 50.

In the present embodiment, the tilt (the angle relative to the plane that is perpendicular to the axis Ax1) of the portion of the specific shape surface 570, which is located on the side where the bottom surface 550 is placed, is small. Therefore, like in the second embodiment, it is possible to limit the valve closing in the state where the valve main body 700 partially rides on the specific shape surface 570.

Sixth Embodiment

Figure 14:
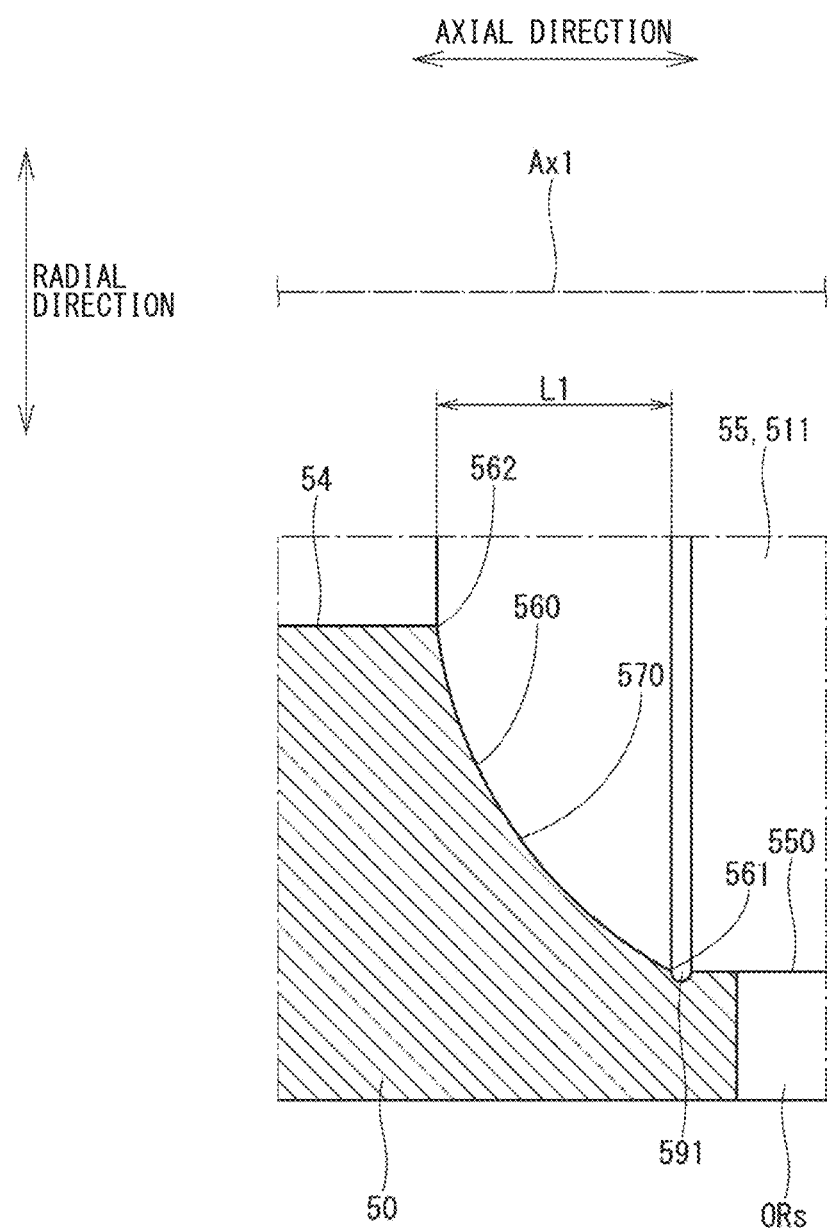
FIG. 14 is a cross-sectional view schematically showing an annular groove of a valve device of a sixth embodiment.

FIG. 14 shows a portion of a valve device according to a sixth embodiment. The sixth embodiment differs from the first embodiment with respect to the structure of the annular groove 55.

In the sixth embodiment, each specific shape surface 570 is formed such that the diameter reduction rate, which is the degree of the diameter reduction of the specific shape surface 570, is progressively increased from the one radial side of the side peripheral surface 560 where the bottom surface 550 is placed toward the other radial side of the side peripheral surface 560 where the inner peripheral wall 54 is placed while the specific shape surface 570 is concave toward the outer side in the radial direction of the inner sleeve 50. As shown in FIG. 14, in the cross section taken along the plane that includes the entire axis Ax1 of the inner sleeve 50, the specific shape surface 570 is shaped in a form of a smooth arc that is concave toward the outer side in the radial direction of the inner sleeve 50.

Other than the points described above, the structure of the sixth embodiment is similar to that of the first embodiment. In the sixth embodiment, since each annular groove 55 has the specific shape surfaces 570 like in the first embodiment, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

As discussed above, in the present embodiment, each specific shape surface 570 is formed such that the diameter reduction rate, which is the degree of the diameter reduction of the specific shape surface 570, is progressively increased from the one radial side of the side peripheral surface 560 where the bottom surface 550 is placed toward the other radial side of the side peripheral surface 560 where the inner peripheral wall 54 is placed while the specific shape surface 570 is concave toward the outer side in the radial direction of the inner sleeve 50.

In the present embodiment, the tilt (the angle relative to the plane that is perpendicular to the axis Ax1) of the portion of the specific shape surface 570, which is located on the side where the inner peripheral wall 54 is placed, is small. Therefore, an angle of collision between the valve main body 700 and the specific shape surface 570 can be made small to reduce wearing between the valve main body 700 and the specific shape surface 570 at the valve closing time of the valve main body 700 upon occurrence of large tilt of the valve main body 700.

Seventh Embodiment

Figure 15:
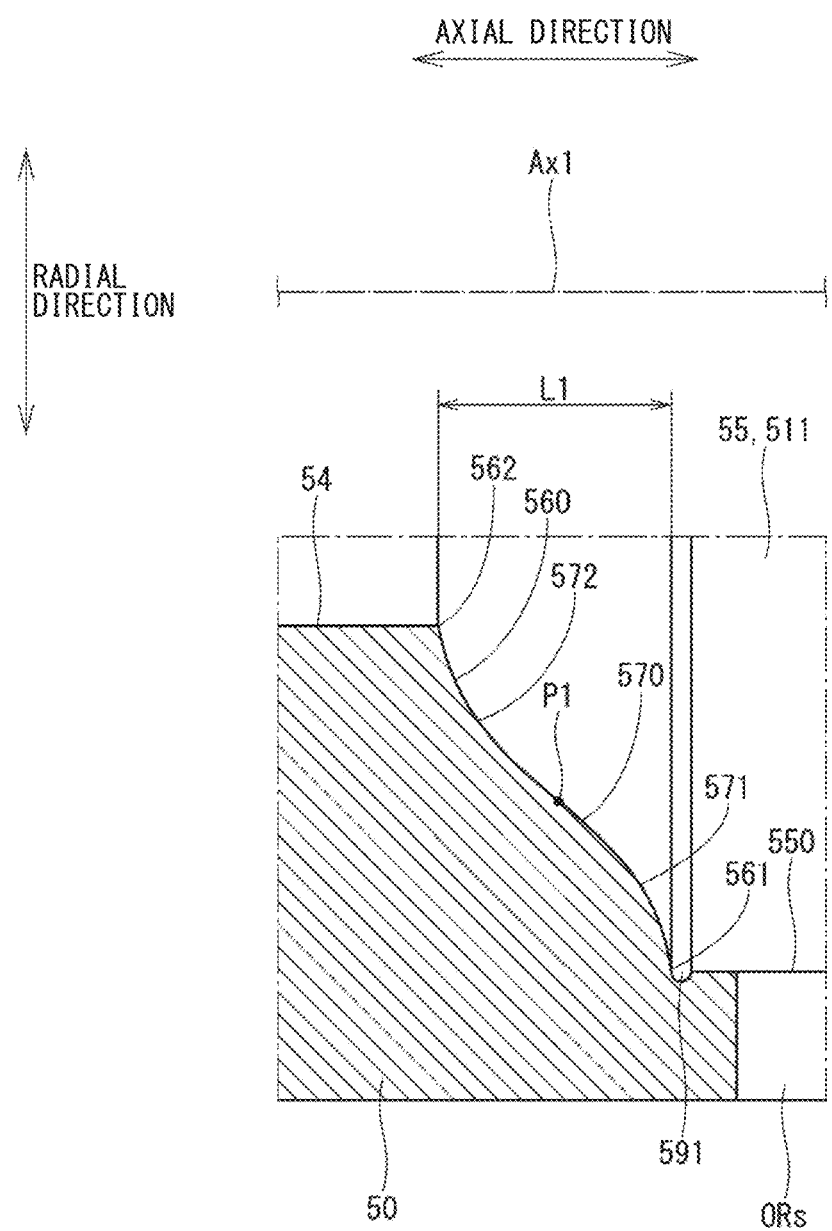
FIG. 15 is a cross-sectional view schematically showing an annular groove of a valve device of a seventh embodiment.

FIG. 15 shows a portion of a valve device according to a seventh embodiment. The seventh embodiment differs from the first embodiment with respect to the structure of the annular groove 55.

In the seventh embodiment, the specific shape surface 570 has a convex surface 571 and a concave surface 572. The convex surface 571 is formed such that a diameter reduction rate, which is a degree of a diameter reduction of the convex surface 571, is reduced from the one radial side of the side peripheral surface 560 where the bottom surface 550 is placed toward the other radial side of the side peripheral surface 560 where the inner peripheral wall 54 is placed while the convex surface 571 is convex toward the inner side in the radial direction of the inner sleeve 50. The concave surface 572 is formed such that a diameter reduction rate, which is a degree of a diameter reduction of the concave surface 572, is increased from the one radial side of the side peripheral surface 560 where the bottom surface 550 is placed toward the other radial side of the side peripheral surface 560 where the inner peripheral wall 54 is placed while the concave surface 572 is concave toward the outer side in the radial direction of the inner sleeve 50.

The convex surface 571 is formed at the one radial side of the side peripheral surface 560 where the bottom surface 550 is placed such that the outer peripheral end of the convex surface 571 is joined to the bottom surface 550. The concave surface 572 is formed at the other radial side of the side peripheral surface 560 where the inner peripheral wall 54 is placed such that the outer peripheral end of the concave surface 572 is joined to the convex surface 571, and the inner peripheral end of the concave surface 572 is joined to the inner peripheral wall 54. As shown in FIG. 15, in a cross section taken along a plane that includes the entire axis Ax1 of the inner sleeve 50, the convex surface 571 is shaped in a form of a smooth arc that is convex toward the inner side in the radial direction of the inner sleeve 50. Furthermore, the concave surface 572 is shaped in a form of a smooth arc that is concave toward the outer side in the radial direction of the inner sleeve 50. Furthermore, an inflection point P1 is set at a boundary between the convex surface 571 and the concave surface 572. A sign of the curvature of the specific shape surface 570 changes at the inflection point P1.

Other than the points described above, the structure of the seventh embodiment is similar to that of the first embodiment. In the seventh embodiment, since each annular groove 55 has the specific shape surfaces 570 like in the first embodiment, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

As discussed above, according to the present embodiment, the specific shape surface 570 has: the convex surface 571 that is formed such that the diameter reduction rate, which is the degree of the diameter reduction of the convex surface 571, is reduced from the one radial side of the side peripheral surface 560 where the bottom surface 550 is placed toward the other radial side of the side peripheral surface 560 where the inner peripheral wall 54 is placed while the convex surface 571 is convex toward the inner side in the radial direction of the inner sleeve 50; and the concave surface 572 that is joined to the convex surface 571 and is formed such that the diameter reduction rate, which is the degree of the diameter reduction of the concave surface 572, is increased from the one radial side of the side peripheral surface 560 where the bottom surface 550 is placed toward the other radial side of the side peripheral surface 560 where the inner peripheral wall 54 is placed while the concave surface 572 is concave toward the outer side in the radial direction of the inner sleeve 50.

In the present embodiment, the convex surface 571 is formed at the one radial side of the side peripheral surface 560 where the bottom surface 550 is placed, and the concave surface 572 is formed at the other radial side of the side peripheral surface 560 where the inner peripheral wall 54 is placed. Therefore, like in the fifth embodiment, it is possible to limit the valve closing of the valve main body 700 by the convex surface 571 in the state where the valve main body 700 partially rides on the specific shape surface 570, and like in the sixth embodiment, it is possible to reduce the angle of collision between the valve main body 700 and the specific shape surface 570 by the concave surface 572 to reduce wearing between the valve main body 700 and the specific shape surface 570 at the valve closing time of the check valve upon occurrence of large tilt of the valve main body 700. In this manner, the two different advantages can be respectively achieved on the one side and the other side of the inflection point P1.

Eighth Embodiment

Figure 16:
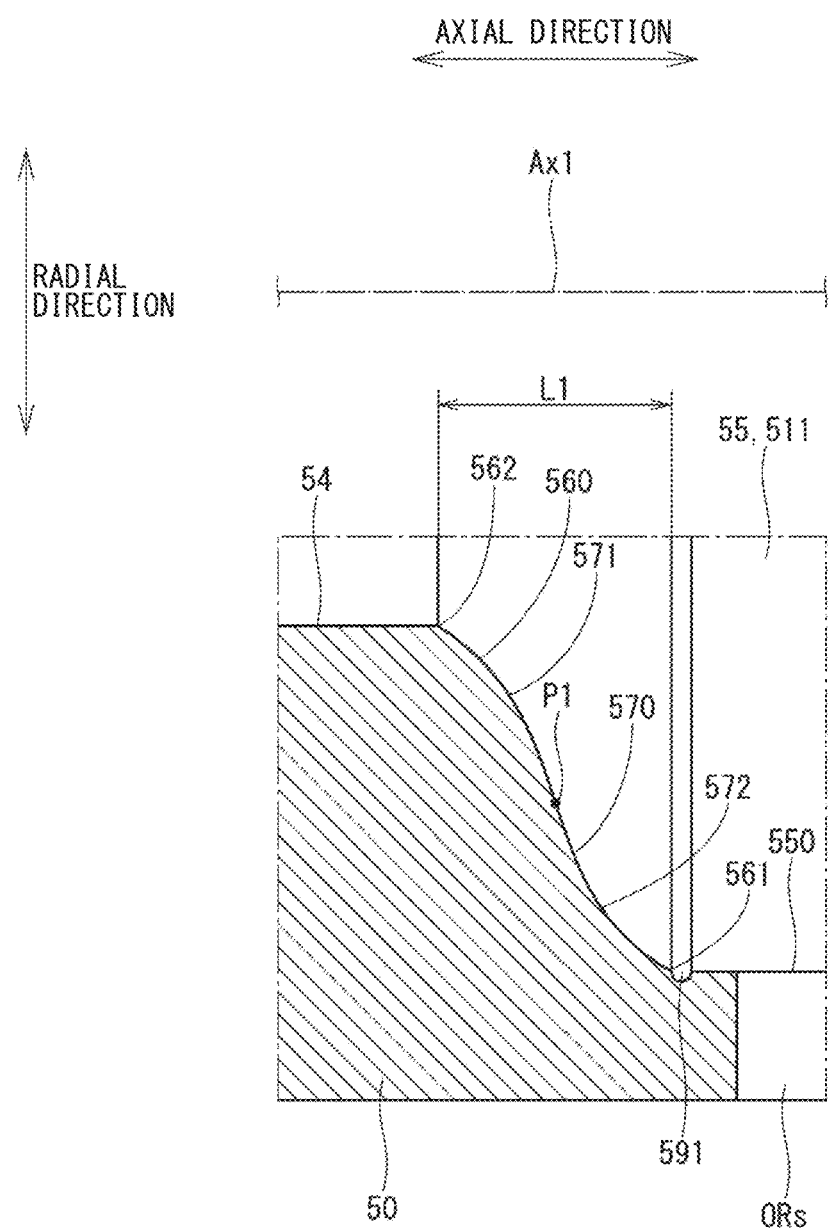
FIG. 16 is a cross-sectional view schematically showing an annular groove of a valve device of an eighth embodiment.

FIG. 16 shows a portion of a valve device according to an eighth embodiment. The eighth embodiment differs from the seventh embodiment with respect to the structure of the annular groove 55.

In the seventh embodiment, the convex surface 571 is formed at the other radial side of the side peripheral surface 560 where the inner peripheral wall 54 is placed such that the inner peripheral end of the convex surface 571 is joined to the inner peripheral wall 54. The concave surface 572 is formed at the one radial side of the side peripheral surface 560 where the bottom surface 550 is placed such that the outer peripheral end of the concave surface 572 is joined to the bottom surface 550, and the inner peripheral end of the concave surface 572 is joined to the convex surface 571.

Other than the points described above, the structure of the eighth embodiment is similar to that of the seventh embodiment. In the eighth embodiment, since each annular groove 55 has the specific shape surfaces 570 like in the seventh embodiment, the movement of the outer peripheral wall of the valve main body 700 toward the bottom surface 550 is guided by the corresponding specific shape surface 570 without resulting in collision of the outer peripheral wall of the valve main body 700 against the inner peripheral wall 54 of the inner sleeve 50 at the valve closing time of the valve main body 700. Therefore, it is possible to limit the collision of the outer peripheral wall of the valve main body 700 against the corner formed between the inner peripheral wall 54 of the inner sleeve 50 and the annular groove 55.

In the present embodiment, the convex surface 571 is formed at the other radial side of the side peripheral surface 560 where the inner peripheral wall 54 is placed, and the concave surface 572 is formed at the one radial side of the side peripheral surface 560 where the bottom surface 550 is placed. Therefore, a cross sectional area of a flow passage at the valve opening time of the valve main body 700 can be increased by the concave surface 572, and thereby the pressure loss can be reduced.

Other Embodiments

In another embodiment of the present disclosure, the specific shape surface may have any diameter reduction rate as long as the diameter of the specific shape surface is reduced from the bottom surface side toward the inner peripheral wall side in the axial direction of the tubular member.

Furthermore, in the above embodiments, there is described the example where each annular groove has the relief grooves. In contrast, in another embodiment of the present disclosure, the annular groove may not have any relief groove.

Furthermore, in the above embodiments, there is described the example where the length of the specific shape surface measured in the axial direction of the tubular member is equal to or larger than 0.4 mm. Alternatively, in another embodiment of the present disclosure, the length of the specific shape surface measured in the axial direction of the tubular member may be smaller than 0.4 mm.

Furthermore, in the above embodiments, the inflow holes are not uniformly arranged along the annular groove in the circumferential direction. Alternatively, in another embodiment of the present disclosure, the inflow holes may be arranged at equal intervals along the entire annular groove in the circumferential direction.

In another embodiment of the present disclosure, the valve device 11 may be configured such that all parts of the valve device 11 are located at the outside of the housing 20. In such a case, the threaded portion 41 may be eliminated from the outer sleeve 40.

In another embodiment of the present disclosure, the housing 20 and the crankshaft 2 may be connected by a transmission member, such as a belt, in place of the chain 6.

The above embodiments illustrate the example in which the vane rotor 30 is fixed to the end part of the camshaft 3, and the housing 20 is rotated synchronously with the crankshaft 2. On the other hand, in another embodiment of the present disclosure, the vane rotor 30 may be fixed to the end part of the crankshaft 2, and the housing 20 may be rotated synchronously with the camshaft 3.

The valve timing adjustment device 10 of the present disclosure may adjust the valve timing of the exhaust valves 5 of the engine 1.

Furthermore, the valve device of the present disclosure may be used to control the hydraulic fluid supplied to a device that is other than the valve timing adjustment device.

As discussed above, the present disclosure is not limited to the above embodiments and can be implemented in various forms without departing from the scope of the present disclosure.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A valve device comprising:
    a tubular member that has:
        an annular groove that is radially outwardly recessed from an inner peripheral wall of the tubular member and circumferentially extends in an annular form; and
        an inflow hole that communicates between a bottom surface of the annular groove and an outer wall of the tubular member while the bottom surface is shaped in a form of a cylindrical surface; and
    a check valve having a valve main body that is made of a single plate material longitudinally elongated and circumferentially wound along a length of the single plate material to have a tubular form, wherein:
    the check valve is installed in the annular groove such that a circumferential direction of the valve main body coincides with a circumferential direction of the bottom surface of the annular groove, and the check valve is configured to enable an inflow of fluid into an inside of the tubular member through the inflow hole and limit an outflow of the fluid from the inside of the tubular member into the inflow hole; and
    the annular groove has:
        a side peripheral surface that is shaped in a ring form and is formed such that the side peripheral surface inwardly extends from the bottom surface in a radial direction of the tubular member and is joined to the inner peripheral wall; and
        a specific shape surface that is formed along at least a part of the side peripheral surface between a bottom surface side end part and an inner peripheral wall side end part of the side peripheral surface such that a diameter of the specific shape surface is progressively reduced in an axial direction of the tubular member from one axial side, at which the bottom surface is placed, toward another axial side, at which the inner peripheral wall is placed while the bottom surface side end part is one end part of the side peripheral surface located at one radial side where the bottom surface is placed, and the inner peripheral wall side end part is another end part of the side peripheral surface located at another radial side where the inner peripheral wall is placed.

2. The valve device according to claim 1, wherein the specific shape surface radially extends from the bottom surface side end part to the inner peripheral wall side end part such that an outer peripheral end of the specific shape surface is joined to the bottom surface, and an inner peripheral end of the specific shape surface is joined to the inner peripheral wall.

3. The valve device according to claim 1, wherein:
    the annular groove has a perpendicular surface, wherein the perpendicular surface is shaped in a ring form and is formed at a corresponding part of the side peripheral surface between the bottom surface side end part and the inner peripheral wall side end part such that the perpendicular surface is perpendicular to an axis of the tubular member;
    the perpendicular surface is formed at the one radial side of the side peripheral surface where the bottom surface is placed such that an outer peripheral end of the perpendicular surface is joined to the bottom surface; and
    the specific shape surface is formed at the another radial side of the side peripheral surface where the inner peripheral wall is placed such that an outer peripheral end of the specific shape surface is joined to the perpendicular surface, and an inner peripheral end of the specific shape surface is joined to the inner peripheral wall.

4. The valve device according to claim 1, wherein:
    the annular groove has a perpendicular surface, wherein the perpendicular surface is shaped in a ring form and is formed at a corresponding part of the side peripheral surface between the bottom surface side end part and the inner peripheral wall side end part such that the perpendicular surface is perpendicular to an axis of the tubular member;
    the perpendicular surface is formed at the another radial side of the side peripheral surface where the inner peripheral wall is placed such that an inner peripheral end of the perpendicular surface is joined to the inner peripheral wall; and
    the specific shape surface is formed at the one radial side of the side peripheral surface where the bottom surface is placed such that an outer peripheral end of the specific shape surface is joined to the bottom surface, and an inner peripheral end of the specific shape surface is joined to the perpendicular surface.

5. The valve device according to claim 1, wherein:
    the annular groove has two perpendicular surfaces, wherein each of the two perpendicular surfaces is shaped in a ring form and is formed at a corresponding part of the side peripheral surface between the bottom surface side end part and the inner peripheral wall side end part such that each of the two perpendicular surfaces is perpendicular to an axis of the tubular member;
    one of the two perpendicular surfaces is formed at the one radial side of the side peripheral surface where the bottom surface is placed such that an outer peripheral end of the one of the two perpendicular surfaces is joined to the bottom surface;
    another one of the two perpendicular surfaces is formed at the another radial side of the side peripheral surface where the inner peripheral wall is placed such that an inner peripheral end of the another one of the two perpendicular surfaces is joined to the inner peripheral wall; and
    the specific shape surface is formed at the side peripheral surface such that an outer peripheral end of the specific shape surface is joined to the one of the two perpendicular surfaces, and an inner peripheral end of the specific shape surface is joined to the another one of the two perpendicular surfaces.

6. The valve device according to claim 1, wherein the specific shape surface is formed such that a diameter reduction rate, which is a degree of a diameter reduction of the specific shape surface, is constant from the one radial side of the side peripheral surface where the bottom surface is placed toward the another radial side of the side peripheral surface where the inner peripheral wall is placed.

7. The valve device according to claim 1, wherein the specific shape surface is formed such that a diameter reduction rate, which is a degree of a diameter reduction of the specific shape surface, is progressively reduced from the one radial side of the side peripheral surface where the bottom surface is placed toward the another radial side of the side peripheral surface where the inner peripheral wall is placed while the specific shape surface is convex toward an inner side in the radial direction of the tubular member.

8. The valve device according to claim 1, wherein the specific shape surface is formed such that a diameter reduction rate, which is a degree of a diameter reduction of the specific shape surface, is progressively increased from the one radial side of the side peripheral surface where the bottom surface is placed toward the another radial side of the side peripheral surface where the inner peripheral wall is placed while the specific shape surface is concave toward an outer side in the radial direction of the tubular member.

9. The valve device according to claim 1, wherein the specific shape surface has:

- a convex surface that is formed such that a diameter reduction rate, which is a degree of a diameter reduction of the convex surface, is reduced from the one radial side of the side peripheral surface where the bottom surface is placed toward the another radial side of the side peripheral surface where the inner peripheral wall is placed while the convex surface is convex toward an inner side in the radial direction of the tubular member; and
- a concave surface that is joined to the convex surface and is formed such that a diameter reduction rate, which is a degree of a diameter reduction of the concave surface, is increased from the one radial side of the side peripheral surface where the bottom surface is placed toward the another radial side of the side peripheral surface where the inner peripheral wall is placed while the concave surface is concave toward an outer side in the radial direction of the tubular member.

10. The valve device according to claim 1, wherein the annular groove includes a relief groove, which is shaped in an annular form and is formed at an end part of the bottom surface, which is located on an axial side where the side peripheral surface is placed in the axial direction, such that the relief groove is recessed from the bottom surface toward an outer side in the radial direction of the tubular member.

11. The valve device according to claim 1, wherein a length of the specific shape surface, which is measured in the axial direction of the tubular member, is equal to or larger than 0.4 mm.

12. The valve device according to claim 1, wherein the inflow hole is one of a plurality of inflow holes that are not uniformly arranged in the circumferential direction along the annular groove.

* * * * *